United States Patent [19]
Handa et al.

[11] Patent Number: 6,096,994
[45] Date of Patent: Aug. 1, 2000

[54] AUTOMATIC WELDING CONDITION SETTING DEVICE

[75] Inventors: Hiroyuki Handa; Shinji Okumura; Hajime Fujii; Takanori Mitsushio; Keiichi Takaoka; Noriyuki Ohsawa; Isao Nishimura; Kiminori Nishimura; Tadayuki Amano; Michiko Suzushima, all of Kitakyushu, Japan

[73] Assignee: Kabushiki Kaisha Yaskawa Denki, Fukuoka, Japan

[21] Appl. No.: 09/029,804

[22] PCT Filed: Sep. 19, 1996

[86] PCT No.: PCT/JP96/02690

§ 371 Date: Mar. 23, 1998

§ 102(e) Date: Mar. 23, 1998

[87] PCT Pub. No.: WO97/10919

PCT Pub. Date: Mar. 27, 1997

[30] Foreign Application Priority Data

| Sep. 19, 1995 | [JP] | Japan | 7-240093 |
| Jan. 31, 1996 | [JP] | Japan | 8-015208 |
| Apr. 9, 1996 | [JP] | Japan | 8-113104 |

[51] Int. Cl.[7] ................................................ B23K 9/95
[52] U.S. Cl. .................................. 219/130.5; 901/42
[58] Field of Search ......................... 219/130.01, 130.1, 219/132, 130.5; 228/102; 702/184; 707/4; 901/42

[56] References Cited

U.S. PATENT DOCUMENTS

| 4,881,678 | 11/1989 | Gaudin | 228/102 |
| 4,883,938 | 11/1989 | Sarugaku | 901/42 |
| 5,111,426 | 5/1992 | Bergstresser Sr., et al. | 707/4 |
| 5,353,238 | 10/1994 | Neef et al. | 702/184 |
| 5,571,431 | 11/1996 | Lantieri et al | 219/130.01 |
| 5,837,968 | 11/1998 | Rohrberg et al. | 219/130.1 |

FOREIGN PATENT DOCUMENTS

| 59-21473 | 2/1984 | Japan . |
| 59-120370 | 7/1984 | Japan . |
| 61-56776 | 3/1986 | Japan . |
| 61-245971 | 11/1986 | Japan . |

*Primary Examiner*—Clifford C. Shaw
*Attorney, Agent, or Firm*—Jordan and Hamburg LLP

[57] ABSTRACT

An apparatus for setting a welding operation condition, enabling the simple setting of an operation and a welding condition is disclosed. The apparatus is provided with a welding information recording portion for recording information concerning a welding machine used in arc welding and welding operation, information concerning a welding operation such as shielding gas related information. A welding wire related information or the like, welding information inputting and outputting device is provided for inputting and outputting the welding operation information. A welding operation information setting device is provided for setting the welding operation information. A retrieving device is provided for retrieving the corresponding information from among the information in the welding information recording portion on the basis of the set information. An information controlling device is provided for applying a retrieval demand to the retrieving device when retrieving the information from the information recording portion and outputting the welding information.

45 Claims, 20 Drawing Sheets

Fig. 6

FULL AUTOMATIC SETTING MODE

JOINT SHAPE: LAP JOINT
THICKNESS OF BASE METAL:
  2.0mm
MATERIAL OF BASE METAL:
  SAPH400
GAP: 0.0mm

SPEED SETTING MODE

JOINT SHAPE: LAP JOINT
THICKNESS OF BASE METAL:
  2.0mm
MATERIAL OF BASE METAL:
  SAPH400
GAP: 0.0mm
WELDING SPEED: 100cm/min

DETAIL SETTING MODE

JOINT SHAPE: LAP JOINT
THICKNESS OF BASE METAL:
  2.0mm
MATERIAL OF BASE METAL:
  SAPH400
GAP: 0.0mm
WELDING SPEED: 100cm/min SHIELD GAS: MAG
WELDING MACHINE: ABC350
BRAND OF WIRE: XYZ
TARGET POSITION: 0.0mm
TARGET ANGLE: 45degree
. . . .

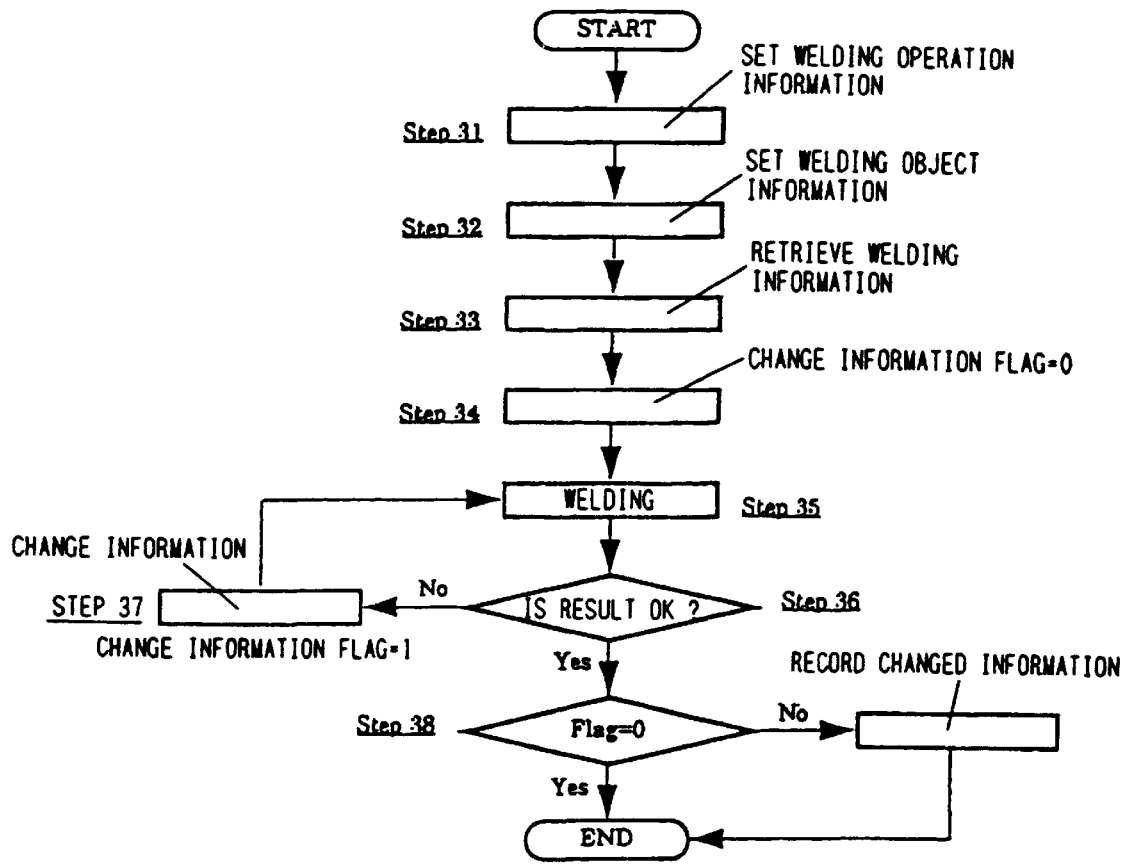
Fig. 8
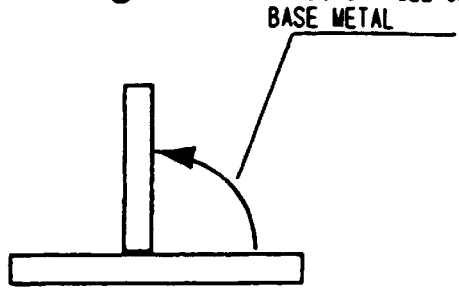
Fig. 9 BONDING ANGLE OF BASE METAL

Fig. 20
(a)
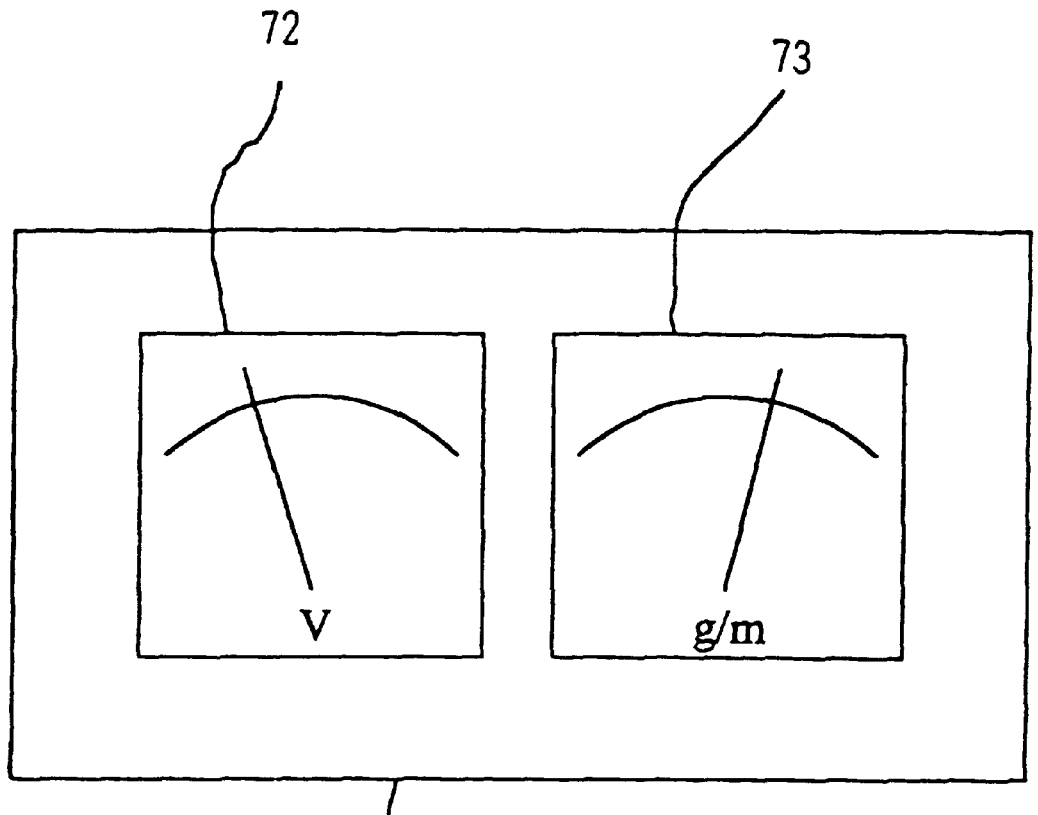
(b)
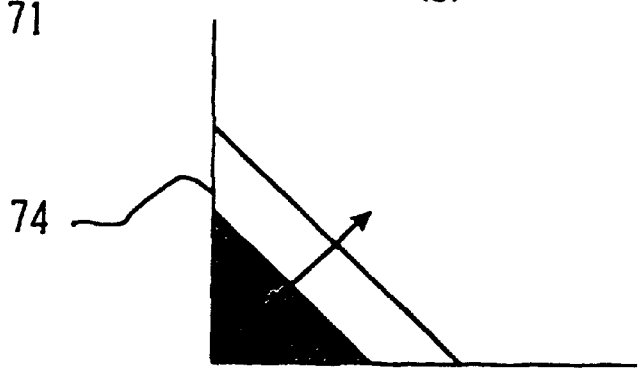

AUTOMATIC WELDING CONDITION SETTING DEVICE

BACKGROUND OF THE INVENTION

The present invention relates to an apparatus for automatically setting a welding condition used for arc welding.

Recently, the performance of arc welding power sources used for arc weldings such as $CO_2$ weldings, MAG weldings or the like have made rapid progress, so that welding conditions can be easily set in comparison to the prior art, thereby improving welding quality as well. However, since a welding phenomenon is a non-linear phenomenon of a multi-input and multi-output system, and is largely influenced by disturbances, the phenomenon is not entirely clear. Thus, improvement in the performance of the welding power source is useful for controlling a wave form of a welding current, a welding voltage or the like within a certain micro-time and for stably maintaining an arc between electrodes. Currently the welding conditions are set by relying on the experience of the operator.

As a technique of automatically setting welding conditions, there is a method described in Japanese Patent Unexamined Publication No. 59-159272, in which a welding condition is easily obtained by using a simple relational expression.

Further, there is a method described in Japanese Patent Examined Publication No. 7-47209, which comprises the steps of storing a plurality of welding parameters, determining the other welding parameters one by one in accordance with a plurality of production rules and determining a welding condition for one welding path by repeating the above steps. There is also a method described in Japanese Patent Unexamined Publication No. 5-57436, which comprises the steps of storing into a data base a welding condition corresponding to a set condition, searching the data base for a welding condition coinciding with an inputted set condition, estimating a welding condition by using a welding condition data estimating portion constituted by a neutral network when the welding condition is not present in the data base and, if the welding result is good, registering all the welding conditions in that case into the data base.

There are rarely enough welding operators at a welding site, so there are many enterprises which promote automated and robotized welding. This is because a welding operator with a superior welding technique is usually of an advanced age, and a lot of labor and time are required for a new welding operator to master a welding technique. However, in the case of simply promoting the automation and robotization of welding, since the work required of the operator increases due to problems in handling the new apparatus and difficulties in setting the welding conditions, a lot of labor and time are required for the operator to master handling of the apparatus and techniques of determining welding conditions, and operation efficiency is lowered. In order to solve the above problem, it is necessary for an operation to be easily set, for a welding condition of a welding becoming an object to be easily set even by a beginner, and for collected welding information to be easily stored as absolute information.

However, in the conventional art, as described in Japanese Patent Unexamined Publication No. 59-159272, there is a method in which a welding condition is set by using a simple relational expression between a welding cross sectional area, a welding current and a welding speed. However a non-linear complex welding phenomenon of a multi-input and multi-output system can not be expressed only by the relational expression between a welding cross sectional area, a welding current and a welding speed (the welding cross sectional area can not be uniformly determined by the influence of scattered spatter and by the attitude of the work object), so that a highly reliable welding can not be obtained. Further, as described in Japanese Patent Examined Publication No. 7-47209, in order to set a welding condition, it is necessary to search many times for a parameter from the storing portion by using the production rule on the basis of the correlational condition between a multiplicity of stored welding parameters and a parameter till the welding conditions become all complete, thereby setting a welding condition. Since the correlation between the welding parameters and the parameter can be independently stored, it is possible to store each as a knowledge having high independence. However, a condition in a process for determining the welding condition is changed since the correlation between the welding parameters and/or the parameter is corrected and canceled, so that there is a problem in that the resulting welding condition becomes information having no reproducibility. Still further, as described in Japanese Patent Unexamined Publication No. 5-57436, since only the welding condition corresponding to the set condition is stored in the data base, there have been problems in that it is not known what results can be obtained if a welding is performed under the retrieved welding condition. If the corresponding welding condition is not registered in the data base, since the data estimating portion estimates the welding condition and, if the welded result is good, the welding condition capable of coping only by the welding condition data estimating portion irrespective of whether or not the welding condition is changed is recorded into the data base, and prolix data are contained in the database, so that there has been a problem in that useless date is generated and the retrieving speed is lowered.

SUMMARY OF INVENTION

A first problem to be solved by the present invention is how to provide a method of and apparatus for setting a welding operation condition, which can be easily used to set a welding condition for a work setting and for a welding object even by a beginner.

A second problem to be solved by the invention is how to provide an apparatus for automatically setting a welding condition, which can be easily used to set a welding condition for a work setting and a welding object even by a beginner, can easily store a series of collected welding information as absolute information and which can easily retrieve the accumulated information.

A third problem to be solved by the invention is how to provide an apparatus for automatically setting a welding condition which can further retrieve the accumulated information within a short period of time.

A fourth problem to be solved by the invention is how to provide a method of setting a welding condition which can be easily set and can obtain a high weld quality.

Conventionally, in order to obtain a desired bead shape and penetration shape, a welding condition such as a welding current, a welding voltage, a welding speed, a welding torch target position, a welding torch target angle or the like has been determined on the basis of the experience accumulated by a skilled engineer in arc welding over a long period of time.

However, in the conventional art, in order to set a welding condition which can obtain a desired bead shape and penetration shape, it is necessary for a welding engineer to accumulate experience over a very long period of time and, further, it has been difficult to pass on that experience. Additionally, when a beginner wants to effectively widen the bead width, it is no a simple task even to determine, among the welding conditions, what condition is changed in what manner.

A fifth problem to be solved by the invention is how to provide an apparatus which can simply adjust a welding condition to obtain a desired bead by any operator.

The conventional apparatus for displaying a welding state is adapted in a manner as shown in FIG. 1. In the drawing, reference numeral 41 denotes a welding state displaying portion, reference numeral 42 denotes a volt meter and reference numeral 43 denotes an ampere meter. Conventionally, in order to obtain a desired bead shape, a skilled arc welding engineer determines a welding current and a welding speed on the basis of long experience, while observing the welded result and an ampere meter in the arc welding machine.

However, in order to make it possible to estimate the welded result from the current value as in the conventional manner, it is necessary to determine things on the basis of long experience and time, so that a high cost has been required. Further, when a less experienced operator is going to perform an arc welding, he may not understand what condition should be set in what manner in order to obtain a desired bead, so that a long period of time is required to obtain a desired bead.

A sixth problem to be solved by the invention is how to provide a method of and apparatus for displaying a welded state in which an operator can easily set a size of a bead by displaying a molten wire amount or a deposition amount in place of a welding current for displaying a welded state, irrespective of the length of experience in arc welding.

A first means, for solving the first problem mentioned above, is an apparatus for automatically setting a welding condition comprising a welding information recording portion for recording welding operation information such as welding machine related information used in an arc welding, shielding gas related information, welding wire related information or the like, welding information inputting and outputting means for inputting and outputting the welding operation information, welding operation information setting means for setting the welding operation information, retrieving means for retrieving corresponding information from among the information in the welding information recording portion on the basis of set information, and information controlling means for instructing a retrieval demand to the retrieving means when retrieving the information form the welding information recording portion and outputting welding information.

According to the first means mentioned above, since the welding operation information is set by the welding information inputting and outputting means in accordance with the welding operation condition setting procedure and/or setting rule previously determined by using the welding information setting means and the welding object information setting means, the information of the apparatus, the material or the like, can be simply set even by a beginner. Thus, the time and a labor for constructing a welding system can be greatly reduced. Further, since the welding operation information can be simply added changed, new information or the like can be added, and it becomes possible to support the construction of a useful welding system.

A second means, for solving the second problem mentioned above, is an apparatus for automatically setting a welding condition comprising a welding information recording portion for recording a welding operation information such as a welding machine used for welding in automating an arc welding or the like, welding object information which shows what kind of object is to be welded, a welding condition to be set when welding with respect to the welding operation information and the welding object information, and a welded result when a welding is performed by the welding condition, as a series of information, welding information inputting and outputting means for inputting and outputting the welding operation information, the welding object information, the welding condition and the welded result, welding operation information setting means for setting the welding operation information, welding object information setting means for setting the welding object information, retrieving means for retrieving the corresponding information from among the information in the welding information recording portion on the basis of a set information, result outputting means for outputting the welding information from the welding information recording portion, information controlling means for sending a retrieval demand to the retrieving means when retrieving the information in the welding information recording portion and outputting welding information, instruction information converting means for converting the welding information outputted by the result outputting means into instruction information for a robot and/or a welding machine, welding information changing means for performing a welding on the basis of welding information converted into the instruction information for the robot and/or the welding machine, automatically or manually changing the welding information when the result does not satisfy a welded quality judging criterion, and changing welding information until the welded result becomes satisfactory, and recording and storing means for recording and storing only changed welding information among the welding information in which the welded result is satisfactory, into the welding information recording portion.

According to the second means mentioned above, since the welding operation information and the welding object information are set by the welding information inputting and outputting means in accordance with the welding operation condition setting procedure and/or setting rule previously determined by using the welding information setting means and the welding object information setting means, the information of the apparatus, the welding object work or the like can be simply set even by a beginner, and since the welding condition is automatically determined by means of retrieving the welding information previously recorded in the welding information recording portion by the retrieving means, a good welded result can be obtained even by a beginner who has never performed a welding, simply by performing a simple operation. Further, if that the welded result is determined to be inappropriate by the result determining portion, the welding condition can be changed in accordance with the preferences of the user, and the changed absolute information and the absolute result can be recorded into the welding information recording portion, so that substantially the same result as with the recorded information can be obtained with very high accuracy by retrieving the same conditions the next time, and a welding condition which is optimal for the user can be achieved by repeating this operation.

Accordingly, special knowledge and experience concerning welding is not required for the operator, and optimal welding information can be easily accumulated.

The third means, for solving the third problem mentioned above, is an apparatus for automatically setting a welding condition comprising a welding information recording portion for recording welding operation information such as a welding machine used for welding in automating arc welding or the like, welding object information which shows what the object to be welded is, a welding condition to be set when welding with respect to the welding operation information and the welding object information, and a welded result when a welding is performed under the welding condition, as a series of information, welding information inputting and outputting means for inputting and outputting the welding operation information, the welding object information, the welding condition and the welded result, welding operation information setting means for setting the welding operation information, welding object information setting means for setting the welding object information, retrieving means for retrieving a corresponding information from among the information in the welding information recording portion on the basis of set information, welding information calculation means constituted on the basis of an experimental expression if the corresponding information is not present in the welding information recording portion, a welding information calculation processing portion for calculating the welding information by using the welding information calculation means, result outputting means for outputting the welding information from the welding information recording portion or the welding information calculation processing portion, information controlling means for sending a retrieval demand to the retrieving means when retrieving the information form the welding information recording portion and, if the welding information is not present in the welding information recording portion, judging the fact that the welding information is absent, thereby sending a calculation demand to the welding information calculation processing portion and outputting the welding information, instruction information converting means for converting the welding information outputted by the result outputting means into instruction information for a robot and/or a welding machine, welding information changing means for performing a welding on the basis of welding information converted into the instruction information for the robot and/or the welding machine, automatically or manually changing the welding information when the result does not satisfy a welded quality judging criterion and changing welding information until the welded result becomes satisfactory, and recording and storing means for recording and storing only changed welding information from among the welding information in which the welded result is satisfactory into the welding information recording portion.

According to this third means, even when the information is not recorded, the calculated value is outputted in the welding information calculation processing portion, so that the setting time for setting the welding condition can be shortened.

A fourth means, for solving the fourth problem mentioned above, is a method of setting a welding condition by calculating the welding condition in an arc welding comprising the steps of setting a welding machine characteristic parameter and/or a welding machine characteristic expression, setting a welding cross sectional area, setting a correction value determined by each of the elements in a welding, setting a thrown metal amount from some of the welding elements and the welding machine characteristic parameter and/or the welding machine characteristic expression, setting a deposited metal amount from some of the welding elements, and calculating a welding condition by means of supposing that a value obtained by multiplying the deposited metal amount by the correction value and the thrown metal amount have the relation of an equality.

In this fourth means, a welding speed is adjusted in such a manner that the obtained welding condition becomes within an allowable range of the welding current or/and an allowable range of the heat input, the welding machine characteristic parameter and/or the welding machine characteristic expression are set by supposing that the relation among the welding current, the welding wire melting speed and the welding voltage is the parameter and/or the characteristic expression, the welding cross sectional area is determined by a welding element such as a joint shape, a thickness of a base metal or the like, the correction value is determined by a welding element such as a joint shape, a thickness of a base metal, a material of a base metal, an attitude of a work, a gap amount of a work, a material of a welding wire or the like and a welding demand element such as a bead width, a penetration depth, an amount of an reinforcement, a leg length or the like, the thrown metal amount is determined by the welding current, a welding wire melting speed, a diameter of a welding wire or the like, and the deposited metal amount is determined by the welding cross sectional area and the welding speed.

A fifth means, for solving the fifth problem mentioned above, is an apparatus for adjusting a welding condition in which at least one of the welding conditions such as "a welding current", "a welding voltage", "a welding speed", "a target position of a welding torch" and "a target angle of a welding torch" is automatically adjusted by adjusting at least one of the welded results such as a bead shape (for example, "a size", "a leg length", "a bead width" and "reinforcement") or/and a penetration shape (for example, "a penetration depth" and "a throat"), and a setting means for setting the bead shape or/and the penetration shape uses a numerical value and a meter, or a graphical user interface (GUI) with figure(s) graphically showing a joint shape or/and a bead shape.

According to the fifth means mentioned above, since the welding condition can be automatically adjusted by adjusting at least one of the welded results such as a bead shape or/and a penetration shape, it is not necessary for the user to consider what condition among the welding conditions should be adjusted in order to obtain a desired welded result, so that even a beginner can simply set the welding condition. Further, since the numerical value and the meter, or the GUI with figure(s) graphically showing the joint shape or/and the bead shape are used for the setting means for setting the bead shape or/and the penetration shape, an adjustment of a desired welded result becomes intuitive and very understandable.

A sixth means, for solving the sixth problem mentioned above, is an apparatus for displaying a welding state in which in a consumable electrode arc welding in a welding state is displayed as a molten amount of a welding wire or a deposited amount to a base metal, an analogue/digital meter or a graphic is used in a displaying portion thereof, a fixed parameter storing portion for storing a plurality of predetermined fixed parameters for determining the molten welding wire amount or the deposited amount, an inputting portion for inputting a plurality of variable parameters set when welding, a temporary storing portion for temporarily storing the inputted variable parameter, a computing portion for computing a molten welding wire amount or a deposited amount on the basis of the information of the fixed parameter storing portion and the temporary storing portion, an information converting portion for converting the information computed by the computing portion and the converted information are displayed on the displaying portion, the fixed parameter storing portion stores a relational expression for determining a molten welding wire amount or a deposited amount to a base metal and coefficients of the relational expression, the inputting portion is constituted by at least one of a switch, a numeric value, an electric/electronic signal, a graphical user interface (GUI), and the inputting portion inputs only a welding current or at least one of a wire diameter, a wire extension and a welding speed, and a welding current, the computing portion computes by substituting the coefficients of the stored relational expression and the information stored in the temporary storing portion for the relational expression determining the molten welding wire amount or the deposited amount, which is stored in the fixed parameter storing portion, and the information converting portion converts the information computed by the computing portion into a numerical value and an/electronic signal.

According to the sixth means mentioned above, since the molten wire amount or the deposited amount to the base metal is displayed for displaying the welding state in place of the welding current, the operator can easily set the size of the bead irrespective of experience in arc welding.

BRIEF DESCRIPTION OF DRAWINGS

FIG. 6 is a table which shows the setting from welding information in welding information inputting and outputting means;

FIG. 8 is a flow chart which exemplifies the total flow of a second embodiment;

FIG. 9 is a reference view of a bonding angle of base metals;

FIG. 14 is a flow chart which shows a method of obtaining a correction value a;

FIG. 20 is a schematic view which shows a welding state displaying portion in a sixth embodiment of the invention;

DETAILED DESCRIPTION OF THE INVENTION

A first embodiment of the invention is described below with reference to the attached drawings.

Figure 1:
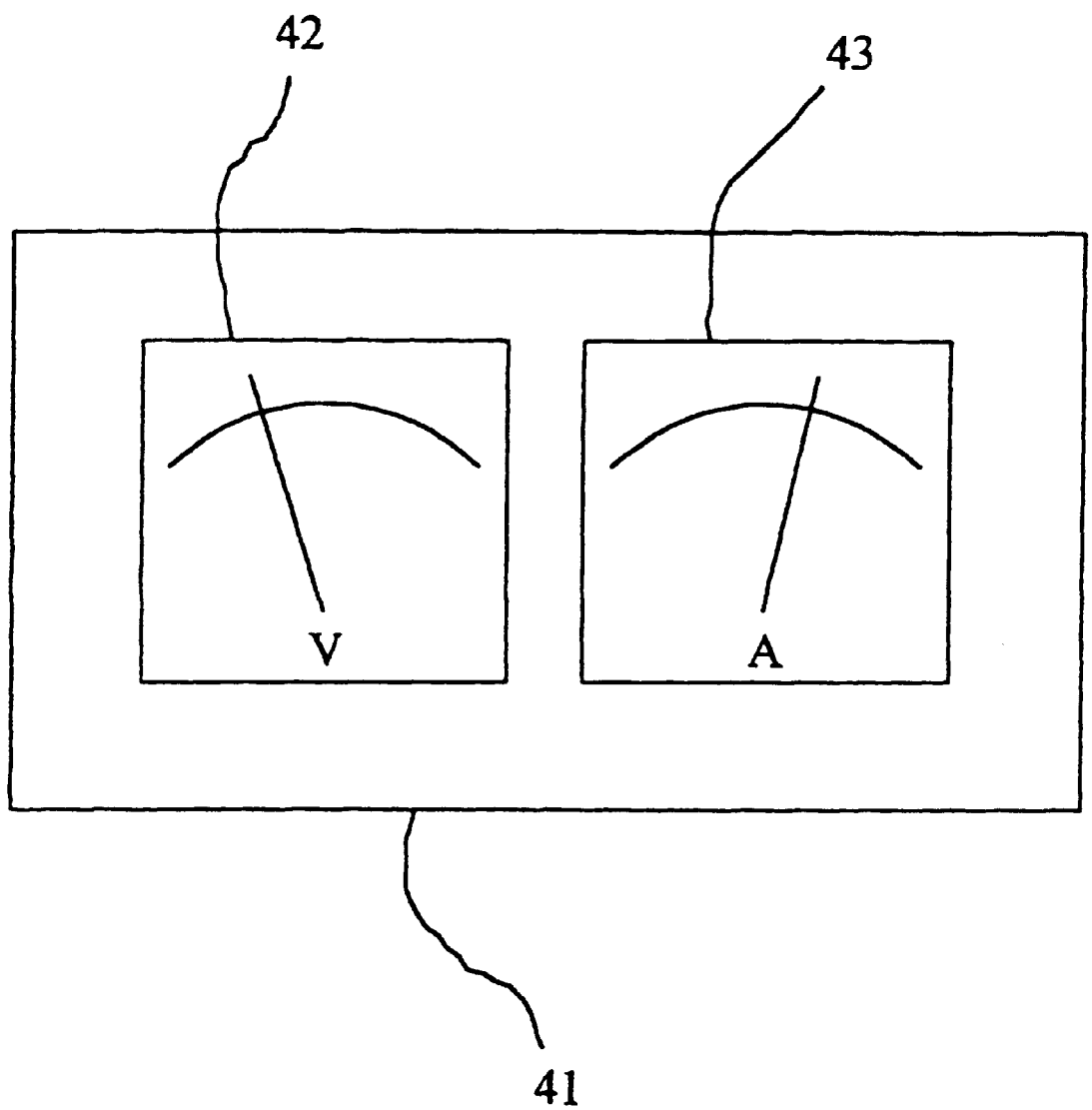
FIG. 1 is a front elevational view which shows a welding state displaying portion in the conventional art.
Figure 2:
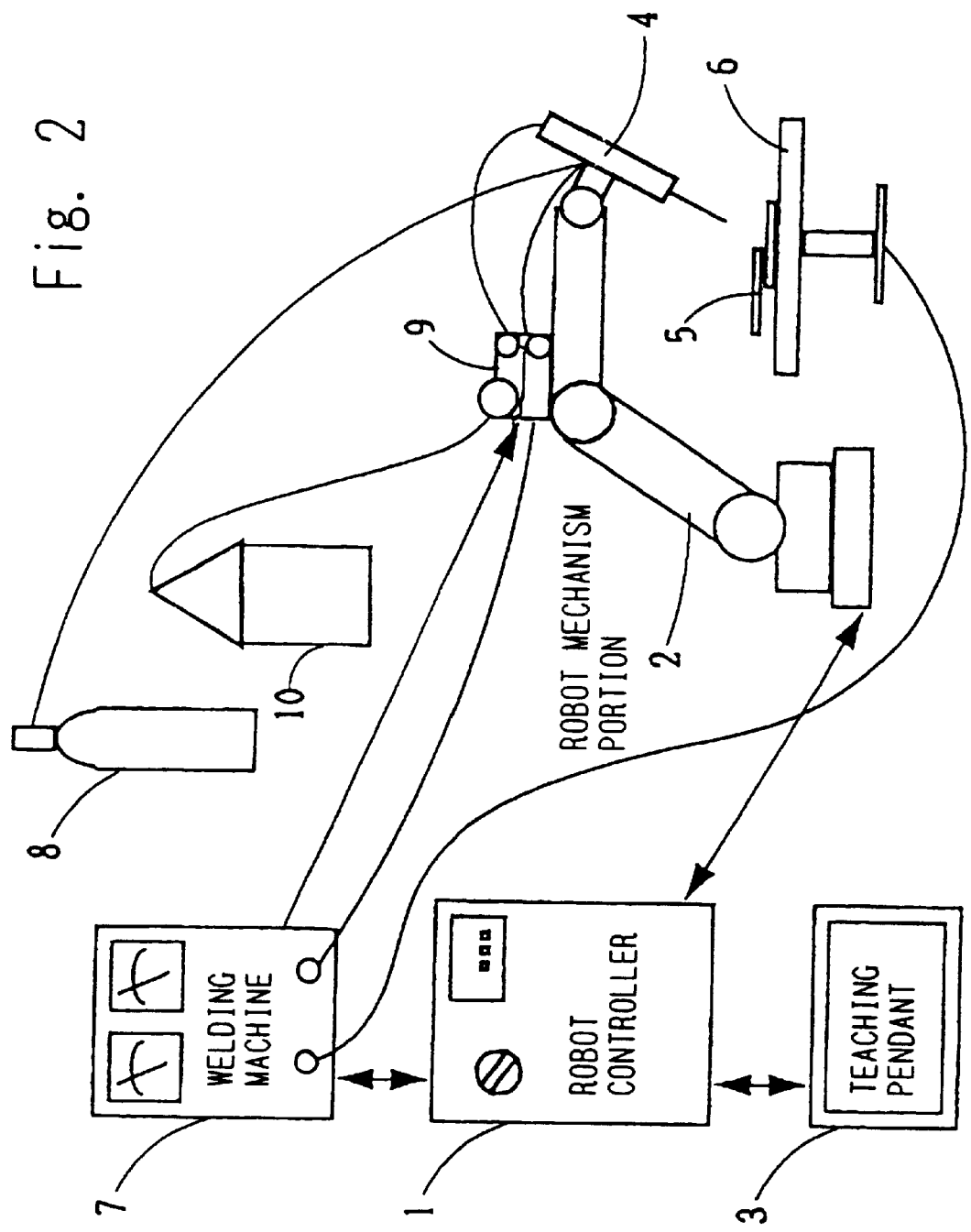
FIG. 2 is a schematic view which shows the total structure of an apparatus realizing the invention.

FIG. 2 is a schematic view which shows an overall structure of an apparatus realizing the first embodiment of the invention. Reference numeral 1 denotes a robot controller which controls a robot mechanism portion 2 and an arc welding machine 7. The robot controller 1 and the robot mechanism portion 2 are connected to each other by a motor driving cable, a cable for feeding back rotating information from an encoder provided in the motor to the robot controller 1, and the like. A six-axis vertical multi-joint manipulator is used in the robot mechanism portion 2. Reference numeral 3 denotes a teaching pendant which teaches an operation to the robot and displays various states of the robot and the like, and which has a wide screen and can display a multiplicity of colors. Reference numeral 4 denotes a welding torch in which there is provided a hole through which a welding wire, supplied from a welding wire packaging portion 10 by a wire feeding apparatus 9, can smoothly pass and a passage for a shielding gas supplied from a shielding gas tank 8. A shielding gas is discharged from a front end portion of the welding torch 4. Further, a copper electric power supplying tip for supplying welding electric power to a welding wire is attached to the front end portion of the welding torch 4. Reference numeral 5 denotes the work to be welded, and a fixing jig 6, for fixing the work to be welded and changing the attitude of the work 5 to be welded.

Figure 3:
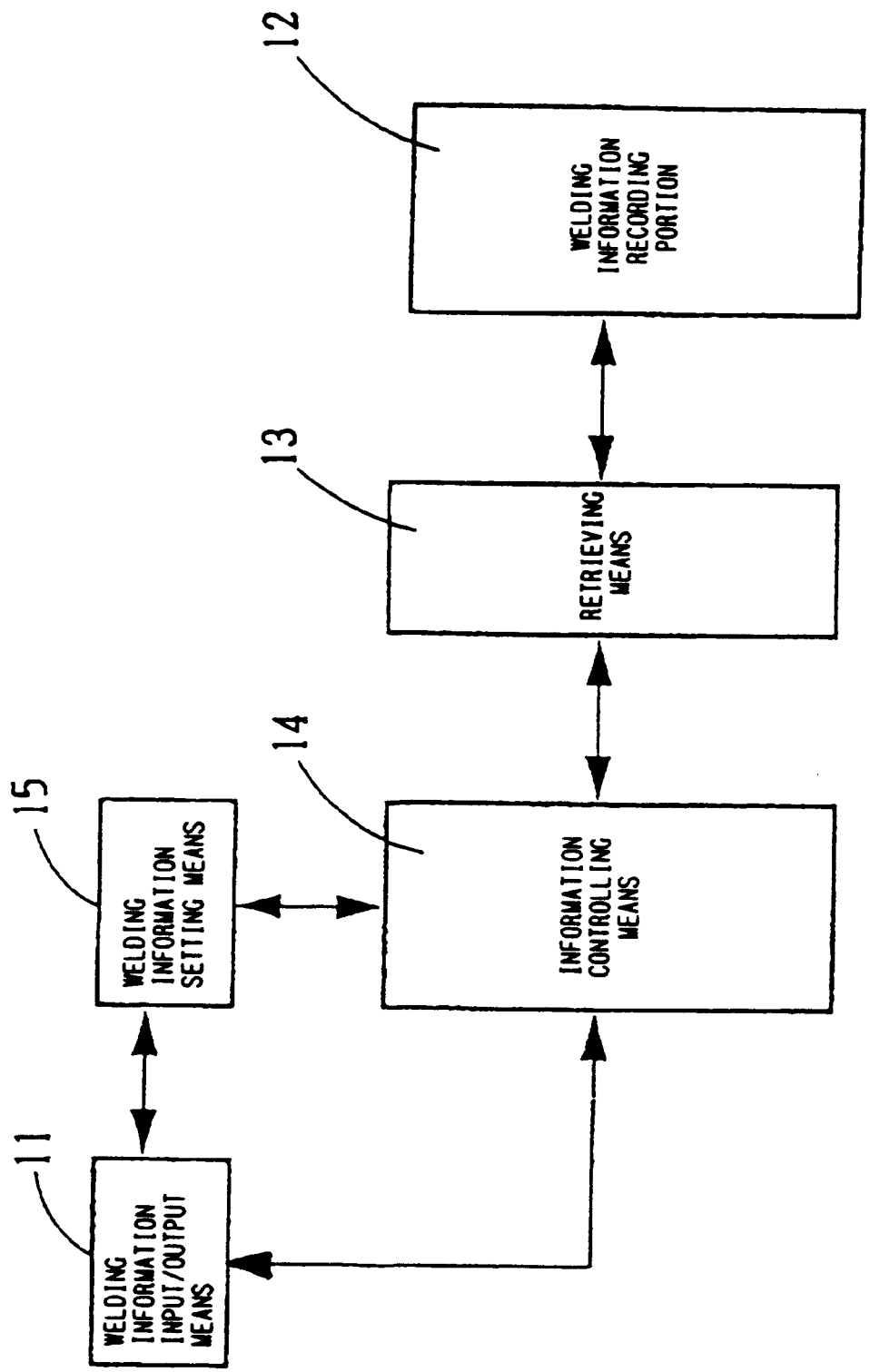
FIG. 3 is a block diagram which shows the flow of an information in a first embodiment of the invention.

FIG. 3 is a block diagram which shows the flow of information in this embodiment. Reference numeral 11 denotes welding information inputting and outputting means which displays or inputs information with the teaching pendant 3 shown in FIG. 2. Reference numeral 12 denotes a welding information recording portion in which welding machine related information used in arc welding and information concerning a welding operation, such as shielding gas related information, and welding wire related information or the like are recorded. Reference numeral 13 denotes information retrieving means for retrieving information coinciding with information designated from among the information in the welding information recording portion.

Reference numeral 14 denotes information controlling means which designates the retrieved information and retrieves the welding operation information in the welding information recording portion 12 by using the retrieving means 13 so as to give the information to welding operation information setting means 15, and commands the searching means 13 to retrieve the welding information designated in the welding operation information setting means 15 from among the welding information in the welding information recording portion 12 by using the retrieving means 13. Reference numeral 15 denotes welding operation information setting means which corresponds to a portion for setting information concerning a welding machine, a shielding gas, a welding wire or the like, which is not frequently changed when setting a welding environment, and it outputs to the welding information inputting and outputting means 11 from the welding operation information retired from the welding information recording portion 12 through the information controlling means 14 and the retrieving means 13, so that necessary information is selected from the welding information inputting and outputting means 11 so as to set the welding operation information.

Figure 4:
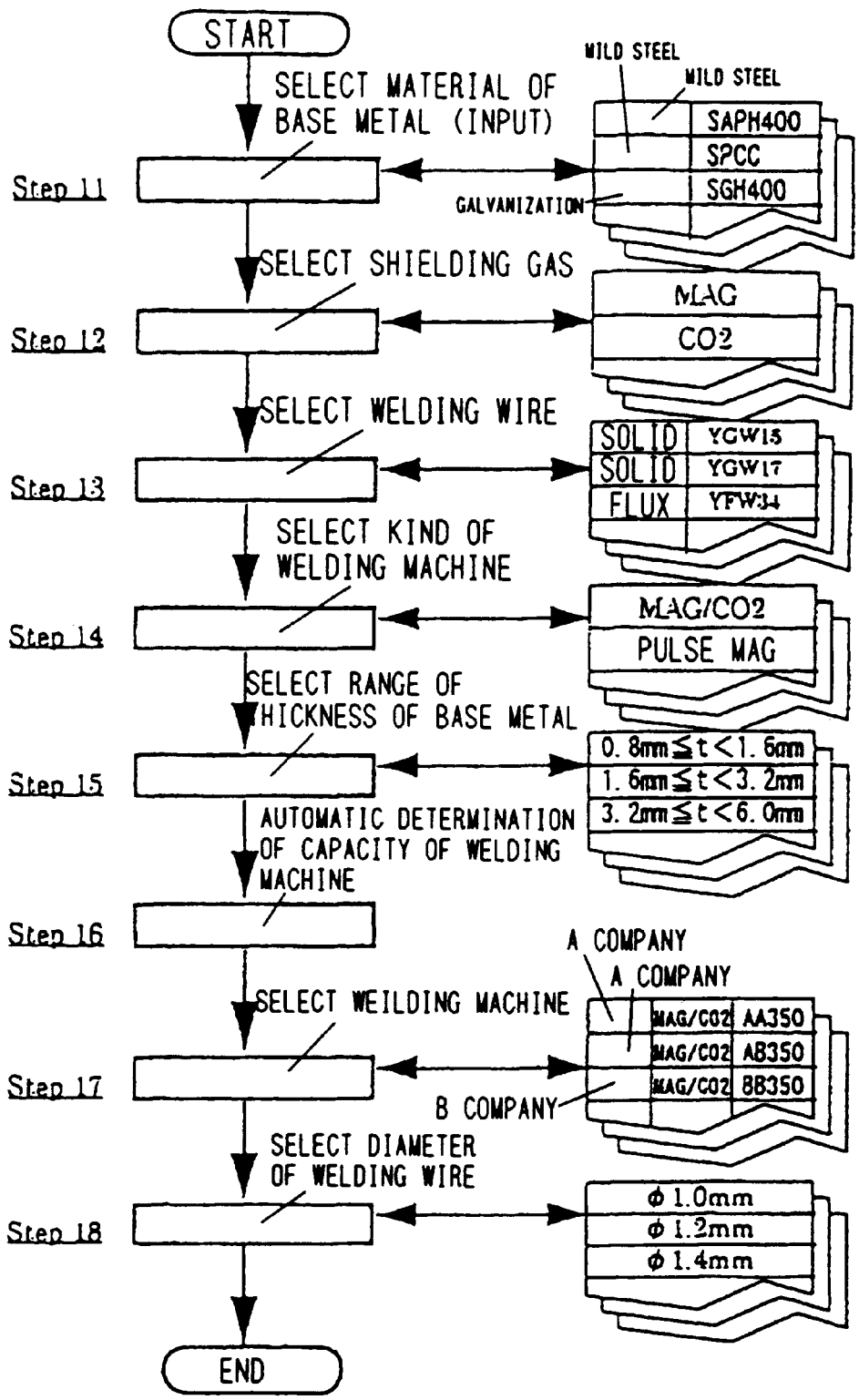
FIG. 4 is a flow chart which shows an example of a process in a welding operation information setting means.

FIG. 4 is a flow chart which shows an example of the welding operation information setting means, and it corresponds to a flow of information in the welding information inputting and outputting means 11, the welding operation information setting means 15, the information controlling means 14, the retrieving means 13 and the welding information recording portion 12 shown in FIG. 3. An example of a method of setting the welding operation information is described below with reference to FIG. 4.

In Step 11, individual data concerning a material of base metal previously recorded is displayed on the welding information inputting and outputting means 11 from the welding information recording portion 12, and the material of base metal is set by commanding the operator to select or input.

Here, "mild steel: SAPH400" is temporarily set.

In Step 12, among the welding rule information recorded in the welding information recording portion 12, only the shielding gas information applicable to the material of the base metal set in Step 11 is displayed on the welding information inputting and outputting means in accordance with the rule information for the relation between a material of base metal and a shielding gas, and the shielding gas is set by commanding the operator to select. Here, "MAG" is temporarily set.

In Step 13, among the welding rule information recorded in the welding information recording portion 12, only the welding wire information applicable to the shielding gas set in Step 12 is displayed on the welding information inputting and outputting means 11 in accordance with the rule information for the relation between a shielding gas and a welding wire, and a welding wire is set by commanding the operator to select. The rule for setting the welding wire may make use of the relation between the material of base metal, the shielding gas and the welding wire, and here, "solid: YGW17" is temporarily set.

In Step 14, among the welding rule information recorded in the welding information recording portion 12, only the information concerning a kind of a welding machine applicable to the shielding gas set in Step 12 is displayed on the welding information inputting and outputting means 11 in accordance with the rule for the relation between shielding gas and a kind of a welding machine, and the kind of a welding machine is set by commanding the operator to select. Here, "MAG/CO$_2$ welding machine" is temporarily set.

In Step 15, among the welding rule information recorded in the welding information recording portion 12, the information concerning the range of thickness of a base metal is displayed on the welding information inputting and outputting means 11, and the range of thickness of the base metal is set by commanding the operator to select. Here, "1.6 mm$\leq$t<3.2 mm" is temporarily set.

In Step 16, among the welding rule information recorded in the welding information recording portion 12, the capacity of a welding machine applied to the range of thickness of a base metal set in Step 15 is automatically set in accordance with the rule information for the relation between the thickness of a base metal and the capacity of a welding machine. Here, tentatively a "350 A class welding machine" is automatically set.

In Step 17, among the welding rule information recorded in the welding information recording portion 12, individual data concerning the welding machine corresponding to the kind of welding machine and the capacity of the welding machine set in Step 14 and Step 16 is displayed on the welding information inputting and outputting means 11 in accordance with the rule of the kind of welding machine and capacity for a welding machine, and a welding machine is set by commanding the operator to select. Here, "A Company's AA350 for MAG/CO$_2$ welding" is temporarily set.

In Step 18, among the welding rule information recorded in the welding information recording portion 12, individual data concerning a diameter of a welding wire corresponding to the welding machine set in the Step 17 is displayed on the welding information inputting and outputting means 11 in accordance with the rule information for a welding machine and a diameter of a welding wire, and a diameter of a welding wire is set by demanding the operator to select. Here, "Φ 1.2 mm" is temporarily set.

A welding system capable of performing welding is constructed by dialogically setting a welding apparatus, a material or the like in accordance with the Step 11 to the Step 18 mentioned above.

A second embodiment of the invention is described below with reference to FIG. 5.

Figure 5:
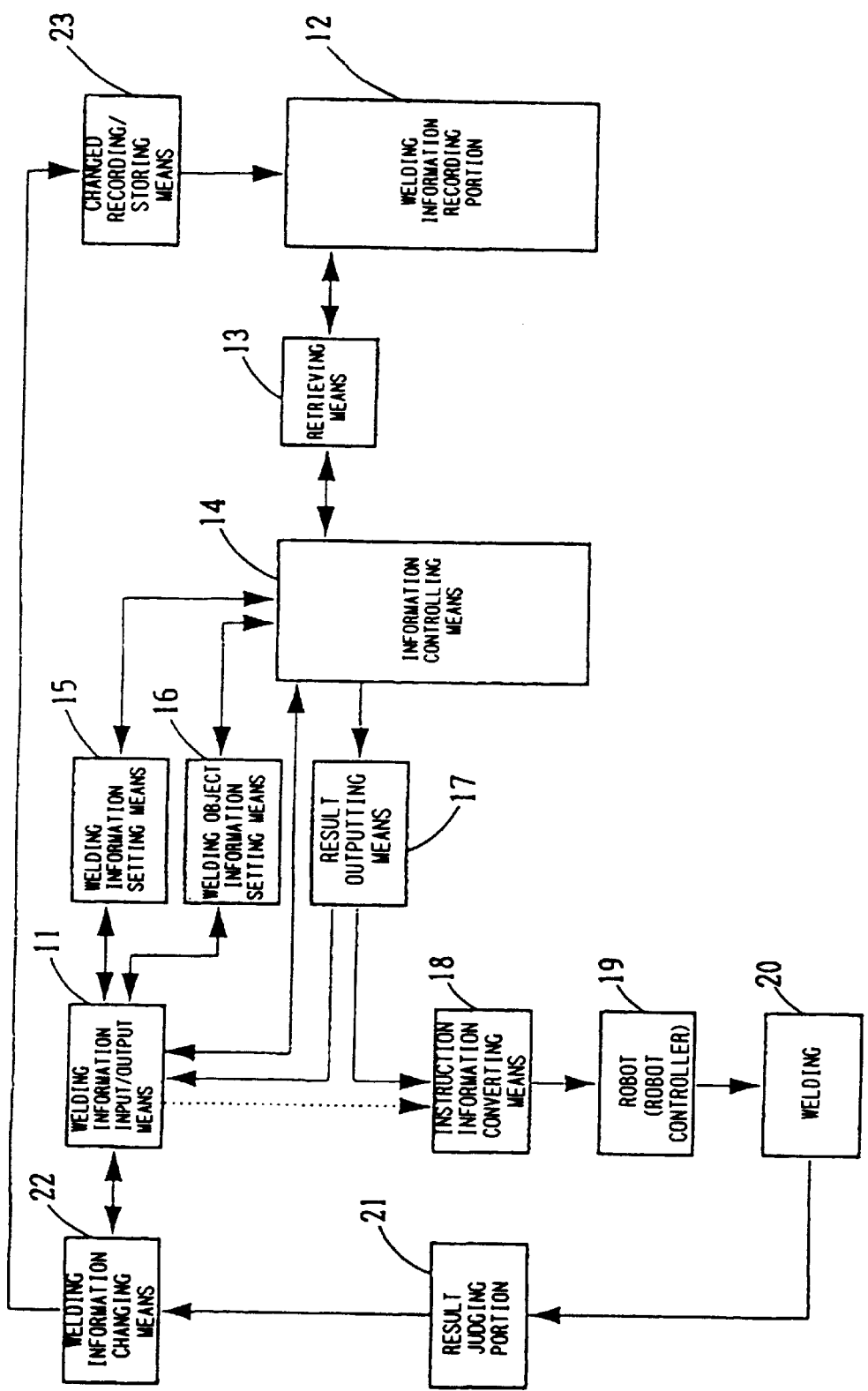
FIG. 5 is a block diagram which shows the flow of information in a second embodiment of the invention.

FIG. 5 is a block diagram which shows the flow of information in this embodiment. Reference numeral 11 denotes welding information inputting and outputting means which displays or inputs information using the teaching pendant 3 shown in FIG. 2. Reference numeral 12 denotes a welding information recording portion in which information concerning a welding machine used in arc welding and a welding operation such as a shielding gas, a welding wire or the like, information concerning a joint shape to be welded and a welding object such as a thickness of a base metal, a material of a base metal, an attitude of a welding object, and information concerning a welding condition such as a welding current, a welding voltage, a welding speed, a welding attitude or the like and a welded result such as a bead width, a penetration depth, a leg length, reinforcement or the like obtained when a welding is performed under the above welding conditions are recorded together with welding operation information and welding object information as a series of welding information. Reference numeral 13 denotes information retrieving means for retrieving information coinciding with or similar to information designated from among the information for the welding information recording portion.

Reference numeral 14 denotes information controlling means which designates the retrieving information and retrieves the welding operation information and the welding object information in the welding information recording portion 12 by using the retrieving means 13, so as to give the information to a welding operation information setting means 15 and welding object information setting means 16. The information control means commands the searching means 13 to retrieve the welding information designated in the welding operation information setting means 15 and the welding object information setting means 16 from among the welding information in the welding information recording portion 12 by using the retrieving means 13, and outputs a welding condition and a welded (expected) result to result outputting means 17.

Reference numeral 15 denotes welding operation information setting means which corresponds to a portion for setting information concerning a welding machine, a shielding gas, a welding wire or the like, which is not frequently changed when setting a welding environment, and it outputs to the welding information inputting and outputting means 11, from the welding operation information in the welding information recording portion 12 through the information controlling means 14 and the retrieving means 13, so that the necessary information is selected from the welding information inputting and outputting means 11 so as to set the welding operation information. The process of the welding operation information setting means is the same as the flow in the first embodiment shown in FIG. 4, so an explanation thereof will be omitted.

Reference numeral 16 denotes welding object information setting means which corresponds to a portion for setting information concerning a kind and a state of a work to be welded or the like, which is frequently changed, and it outputs to the welding information inputting and outputting means 11 from the welding object information in the welding information recording portion 12 through the information controlling means 14 and the retrieving means 13, so that the necessary information is selected from the welding information inputting and outputting means 11 so as to set the welding object information. Reference numeral 17 denotes result outputting means for outputting a retrieved result such as a welding condition and the like or a calculated result, and it gives information to the welding information inputting and outputting means 11 and instruction information converting means 18. The instruction information converting means 18 converts information obtained from a result outputting means into an instruction information to a robot.

Reference numeral 19 denotes a robot (a robot controller) which performs a welding 20 on the basis of the instruction information converted for the robot by the instruction information converting means 18.

A result judging portion 21 evaluates the weld quality during a welding process or after a welding on the basis of a predetermined weld quality judging standard.

Reference numeral 22 denotes welding information changing means which changes the welding information by using the welding information inputting and outputting means 11 when a satisfactory evaluation is not obtained from the result judging portion 21, and repeats a welding and a change in welding information until a satisfactory evaluation is obtained in the welding judging portion 21.

Reference numeral 23 denotes changed recording and storing means for recording and storing only the welding information changed by the welding information changing means 22 to the welding information recording portion.

The welding information inputting and outputting means 11 has, as shown in FIG. 6, three modes comprising a full automatic mode, a speed setting mode, and a detail setting mode as modes for setting a welding information.

In the full automatic mode, only basic welding object information other than the information previously set by the welding operation information setting means 15 is set. Here, in order to make it simple, only a joint shape, a thickness of a base metal, a material of a base metal and a gap are included. A welding speed is determined from relational information between a joint shape, a material of a base metal and a welding speed, which are stored in the welding information recording portion, on the basis of the joint shape and the thickness of the base metal among the basic information.

The speed setting mode is adapted in such a manner that the operator can determine a welding speed automatically in the full automatic mode. This can also be made in such a manner that after the welding speed is first determined in the full automatic mode, the mode is switched to the speed setting mode, thereby changing the welding speed.

The detail setting mode is a mode which is used when a change mainly concerning a detail of a welding method and a welding process, such as when a change of a welding machine and a shielding gas is necessary, and it sets the detail in accordance with the welding process condition setting means.

Figure 7:
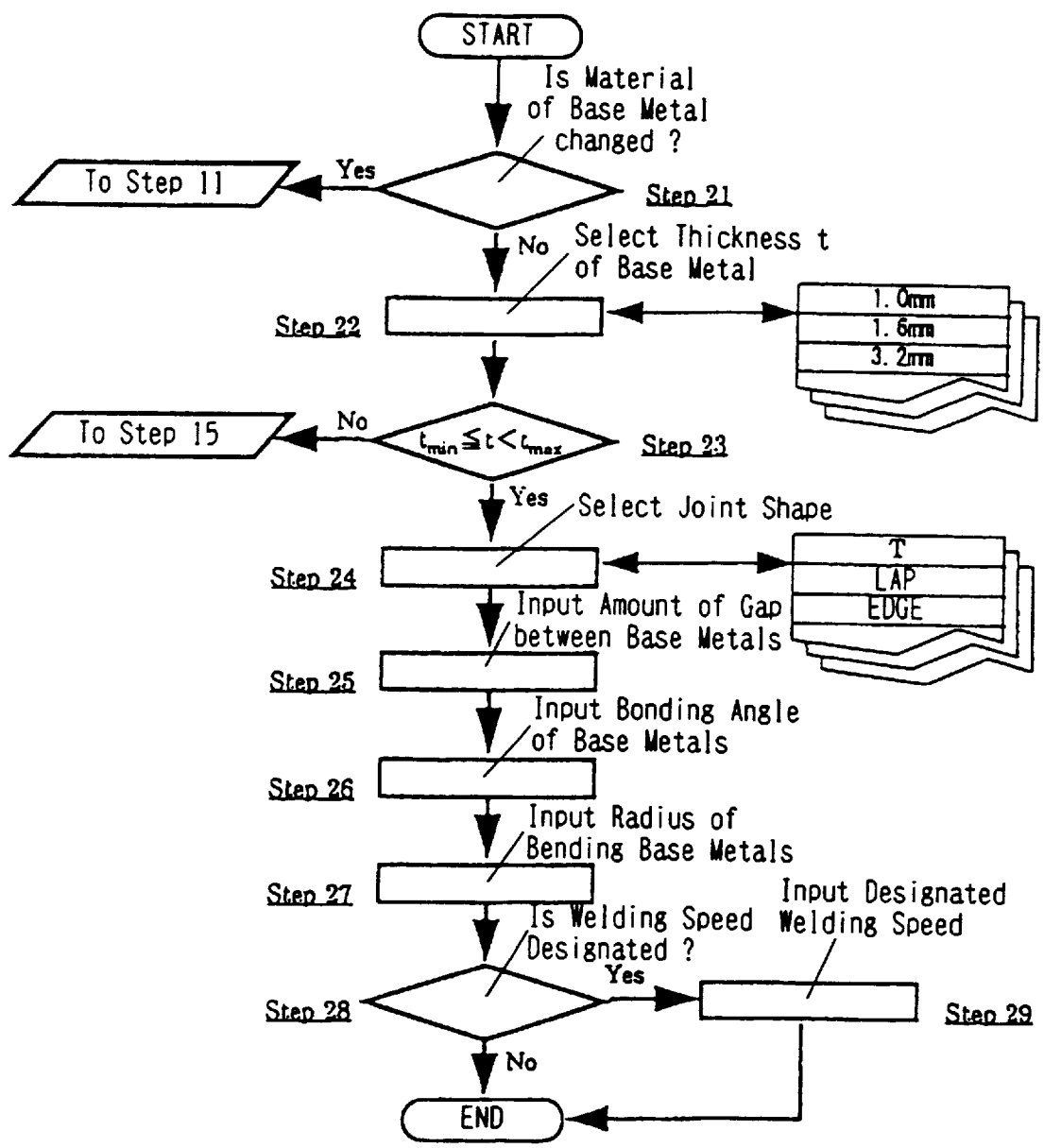
FIG. 7 is a flow chart which shows an example of a process in the welding object information setting means.

FIG. 7 is a flow chart which shows an example of the welding object information setting means 16, and it corresponds to the flow of an information in the welding information inputting and outputting means 11, the welding object information setting means 16, the information controlling means 14, the retrieving means 13 and the welding information recording portion 12, which are shown in FIG. 5. An example for a method of setting the welding object information is described below with reference to FIG. 7.

In Step 21, if the material of the base metal set in Step 11 shown in FIG. 4 is changed, the flow is returned to Step 11 in the welding process information setting means 15, in which the welding process information is reset on the basis of the welding process information setting means. When the material of the base metal is not changed, the flow goes to the next step. Here, it is temporarily considered that the material of the base metal is not changed.

In Step 22, among the individual welding information recorded in the welding information recording portion 12, information concerning a thickness of a base metal is displayed on the welding information inputting and outputting means 11 and the thickness of a base metal is set by commanding the operator to select.

Here, "1.6 mm" is temporarily set.

In Step 23, when the thickness of the base metal set in Step 22 is out of the range of the thickness of the base metal set in Step 15, the flow is returned to Step 15 in the welding process information setting means 15, and when the thickness of the base metal is within the range of the thickness of the base metal set in Step 15, the flow goes to the next step. Here, it is temporarily considered that the thickness of the base metal is within the range of the thickness of the base metal set in Step 15.

In Step 24, among the individual welding information recorded in the welding information recording portion 12, information concerning the joint shape is displayed on the welding information inputting and outputting means 11 and the joint shape is set by commanding the operator to select. Here, "lap joint" is temporarily set.

In Step 25, the amount of a gap between the base metals is set by commanding the operator to input the amount of the gap between the base metals. Here, "0.0 mm" is temporarily set.

In Step 26, a bonding angle of base metals (refer to FIG. 9) is set by commanding the operator to input the bonding angle of base metals in accordance with the joint shape. Here, since "lap joint" is set in the Step 24, it is not necessary to input.

Figure 10:
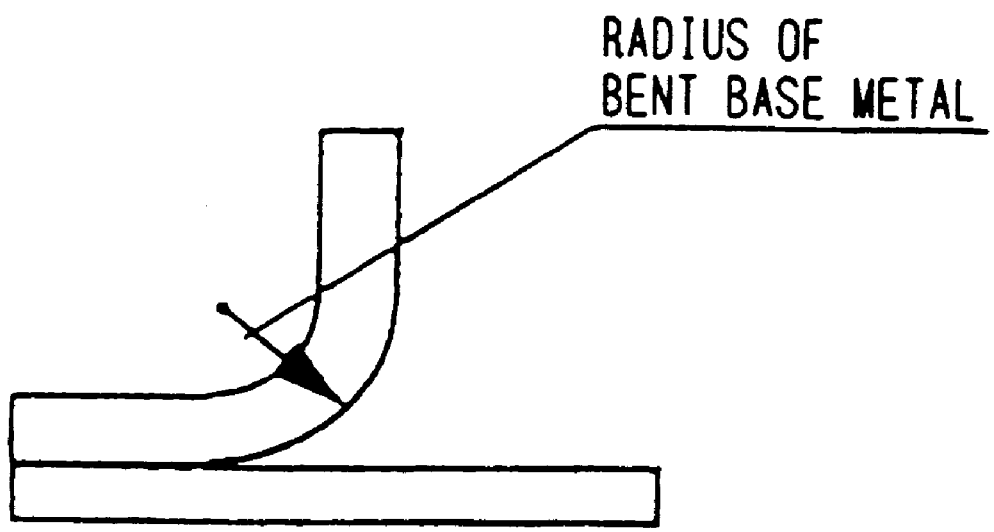
FIG. 10 is a reference view of a radius of bent base metal.

In Step 27, a radius of bent base metal (refer to FIG. 10) is set by commanding the operator to input the radius of the bent base metal in accordance with the joint shape. Here, since "lap joint" is set, it is not necessary to input.

In Step 28, if the operator designates the desired welding speed, the welding speed will be set to be that designated welding speed, but if the welding speed is not designated, the welding speed becomes a default value.

FIG. 8 is a flow chart which exemplifies the total flow in this embodiment, and the detail will be described with reference to this drawing.

In Step 31, welding process information is set by a method as shown in the above example of setting the welding process information.

In Step 32, welding object information is set by a method as shown in the above example of setting the welding object information.

In Step 33, welding information coinciding with the above retrieving information is retrieved from the welding information recording portion 12 on the basis of a series of retrieving information items comprising the above welding process information and the above welding object information.

In Step 34, it is declared that the welding information is not changed. For example, a welding information changing flag (Flag) is set to 0.

In Step 35, a welding is performed on the basis of the welding condition set by the result information in the above welding information retrieval.

In Step 36, as a result of the above welding, when the welded quality judging criterion is satisfied, the flow goes to Step 38, and when the welded quality judging criterion is not satisfied, the flow goes to Step 37.

In Step 37, the above setting of the welding information is changed in accordance with the welding information changing means 22, and it is declared that the welding information is changed. For example, the welding information changing flag is set to 1 and the flow goes to Step 35.

In Step 38, whether or not the welding information has been changed is judged, and when the welding information has not been changed (here, in the case that the welding information changing Flag=0), the setting of the welding information is completed, and when the welding information has been changed (here, in the case that the welding information changing Flag=1), the changed welding information is stored and recorded into the welding information recording portion 12.

A third embodiment of the invention is described below with reference to FIG. 11.

Figure 11:
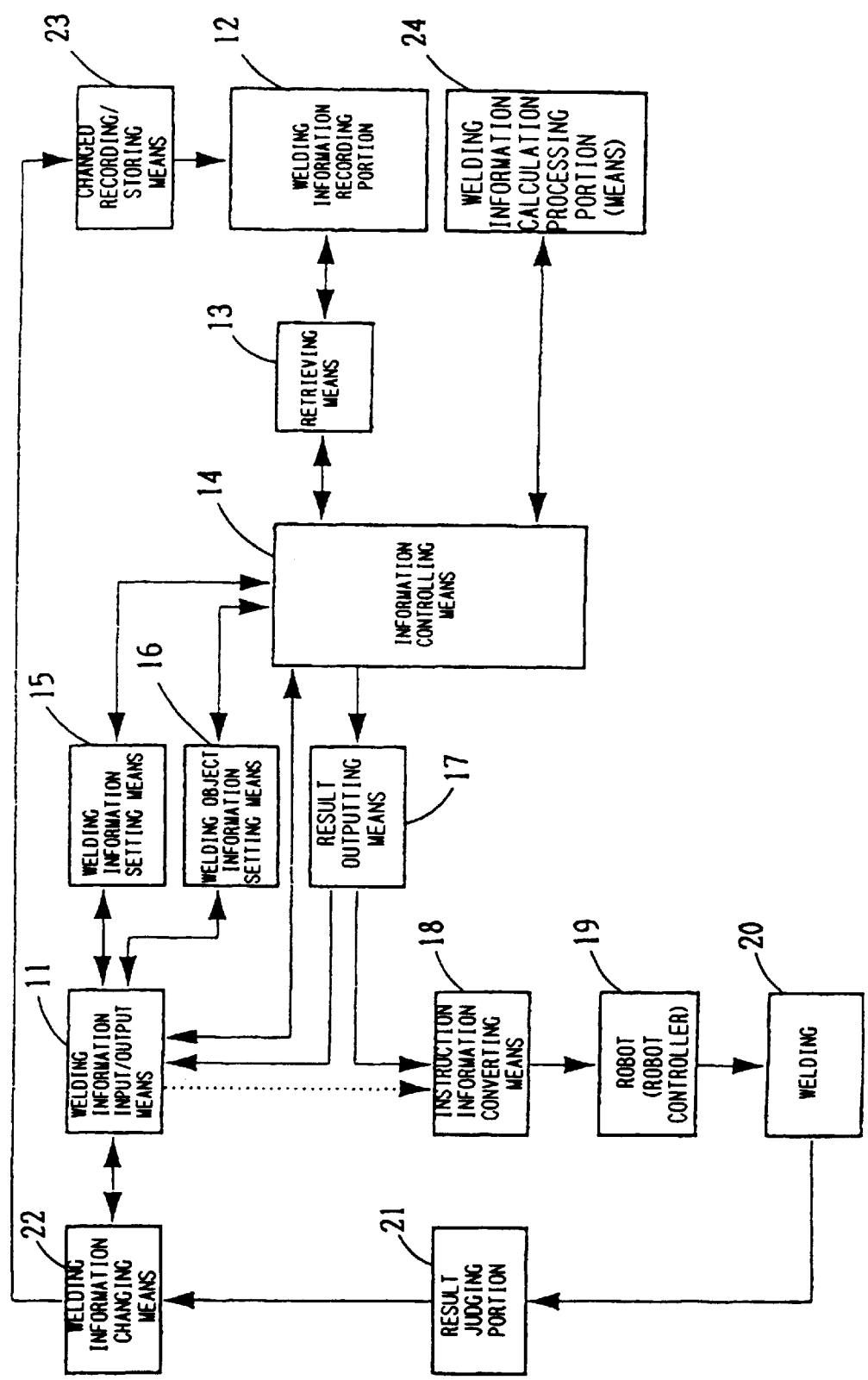
FIG. 11 is a block diagram which shows the flow of information in a third embodiment of the invention.

FIG. 11 is a block diagram which shows the flow of information in this embodiment. One point which differs from the second embodiment shown in FIG. 5 is that a welding information calculation processing portion (welding information calculation processing means) 24 is added. The welding information calculation processing portion 24 is adapted in such a manner as to analyze experimental data on the basis of a balance between a thrown metal amount caused by the melting of a welding wire and a deposited metal amount on a base metal from information concerning a welding machine and a welding operation such as a shielding gas, a welding wire or the like and information concerning a joint shape and a welding object such as thickness of a base metal, material of a base metal or the like, so as to correct by using the correction information and the limiting information previously recorded in the welding information recording portion 12, and to obtain by calculation a welding condition and an expected result after welding.

Figure 12:
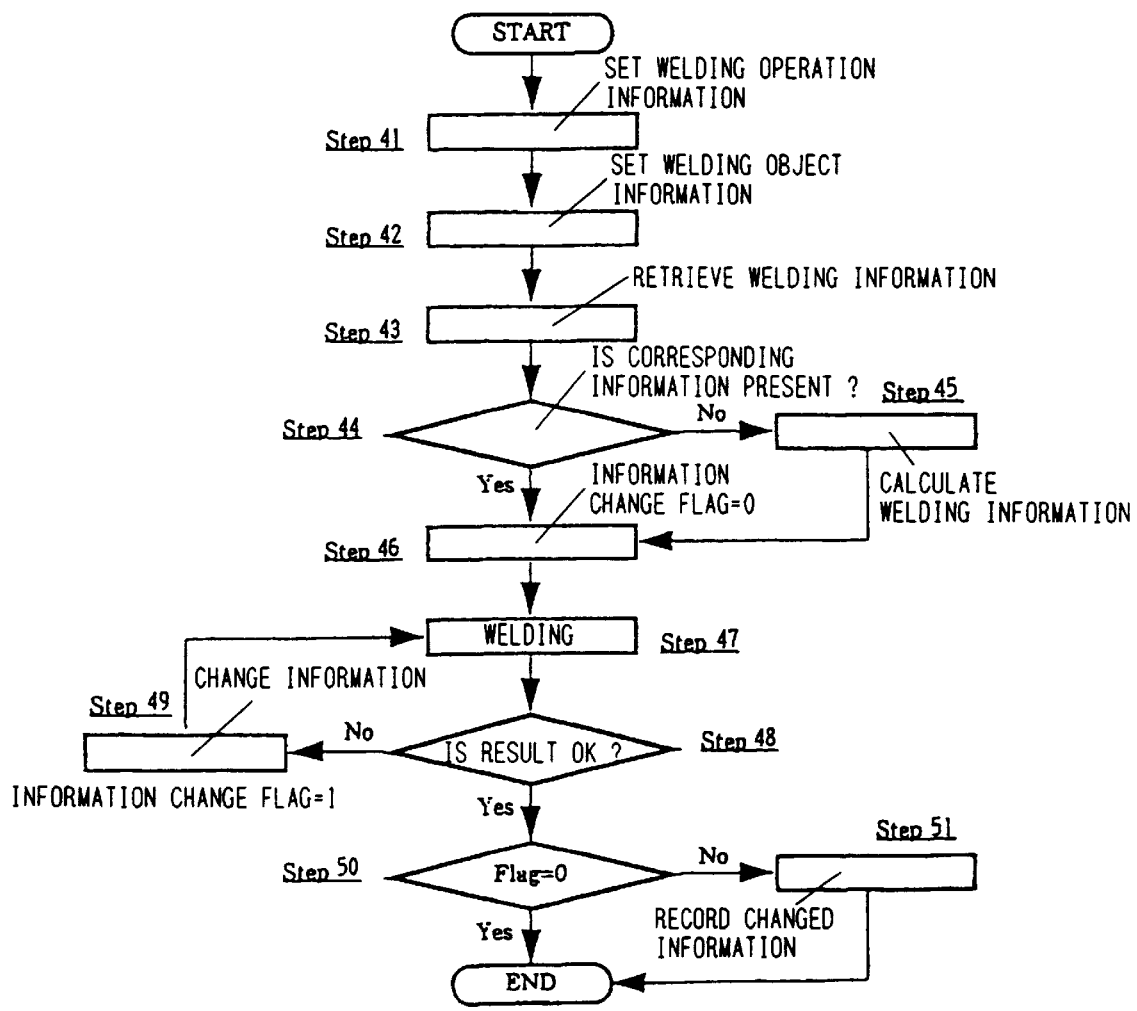
FIG. 12 is a flow chart which exemplifies the total flow of the third embodiment.

FIG. 12 is a flow chart which exemplifies the total flow in this embodiment. Details are described below with reference to this drawing.

In Step 41, welding process information is set by a method as shown in the above example of setting the welding process information in FIG. 4.

In Step 42, welding object information is set by a method as shown in the above example of setting the welding object information in FIG. 7.

In Step 43, welding information coinciding with the retrieving information is retrieved the welding information recording portion 12 on the basis of a series of retrieving information items comprising the above welding process information and the above welding object information.

In Step 44, as a result of the above retrieval, when the relevant information is present in the welding information recording portion 12, the flow goes to Step 46, and when the relevant information is not present, in Step 45 the welding information is calculated by the welding information calculation processing portion 24.

In Step 45, the welding information is calculated by the welding information calculation processing portion 24.

In Step 46, it is declared that the welding information is not changed. For example, the welding information changing flag (Flag) is set to 0.

In Step 47, a welding is performed on the basis of the welding conditions set by the above welding information retrieving or the above welding information calculation.

In Step 48, as a result of the above welding, when the weld quality judging criterion is satisfied, the flow goes to Step 50, and when the welded quality judging criterion is not satisfied, the flow goes to Step 49.

In Step 49, the above setting of the welding information is changed in accordance with the welding information changing means 23, and it is declared that the welding information is changed. For example, the welding information changing flag is set to 1 and the flow goes to Step 47.

In Step 50, it is determined whether or not the welding information is changed, and when the welding information is not changed (here, in the case that the welding information changing Flag=0), the setting of the welding information is completed, and when the welding information is changed (here, in the case that the welding information changing Flag=1), the changed welding information is stored and recorded into the welding information recording portion 12.

As mentioned above, according to this embodiment, since the welding environment is set in accordance with the welding process information setting means for setting the apparatus, and the welding material or the like, the responsibility of the operator in selecting welding supplies having a complex multiplicity of combinations can be largely reduced, and the time needed for setting the welding operation condition can be lessened. Further, since the welding process information setting means can also be easily renewed, fresh information can be obtained. Owing to this, an advantage is obtained in that even a welding beginner can construct an effective and useful welding system without special knowledge.

Still further, since the welding information is previously recorded as an absolute value, when the recorded welding condition is directly used, the reliability of the welding quality becomes significantly higher in comparison with the method of obtaining the welding conditions only by calculation and experiential rules. Thus, when the information is not recorded, the calculated value is outputted in the welding information calculation processing portion, and even a beginner can set the welding conditions with a simple operation. Also, since the welding information can be changed, recorded and stored as absolute values in accordance with the preferences of the operator, each time the operation is repeated the stored welding information becomes more reliable and suitable for the needs of the operator. At this time, since only the changed welding information is recorded, the welding information retrieval is performed within a short period of time. Further, since the welding environment is previously set by using the welding operation information setting means for setting the apparatus or the like which is not frequently changed, the number of settings which should be frequently changed is significantly reduced, making it easier on the operator. Additionally, when setting the welding condition, since the welding condition is retrieved or calculated on the basis of the previously set welding operation information and the welding object information, the condition can be set by a single retrieval or calculation, so that the setting time for setting the welding condition can be shortened.

Owing to these, an advantage is obtained in that even a welding beginner can obtain a welding condition of high reliability without special knowledge, and can use welding information suitable to the preferences of the operator.

Figure 13:
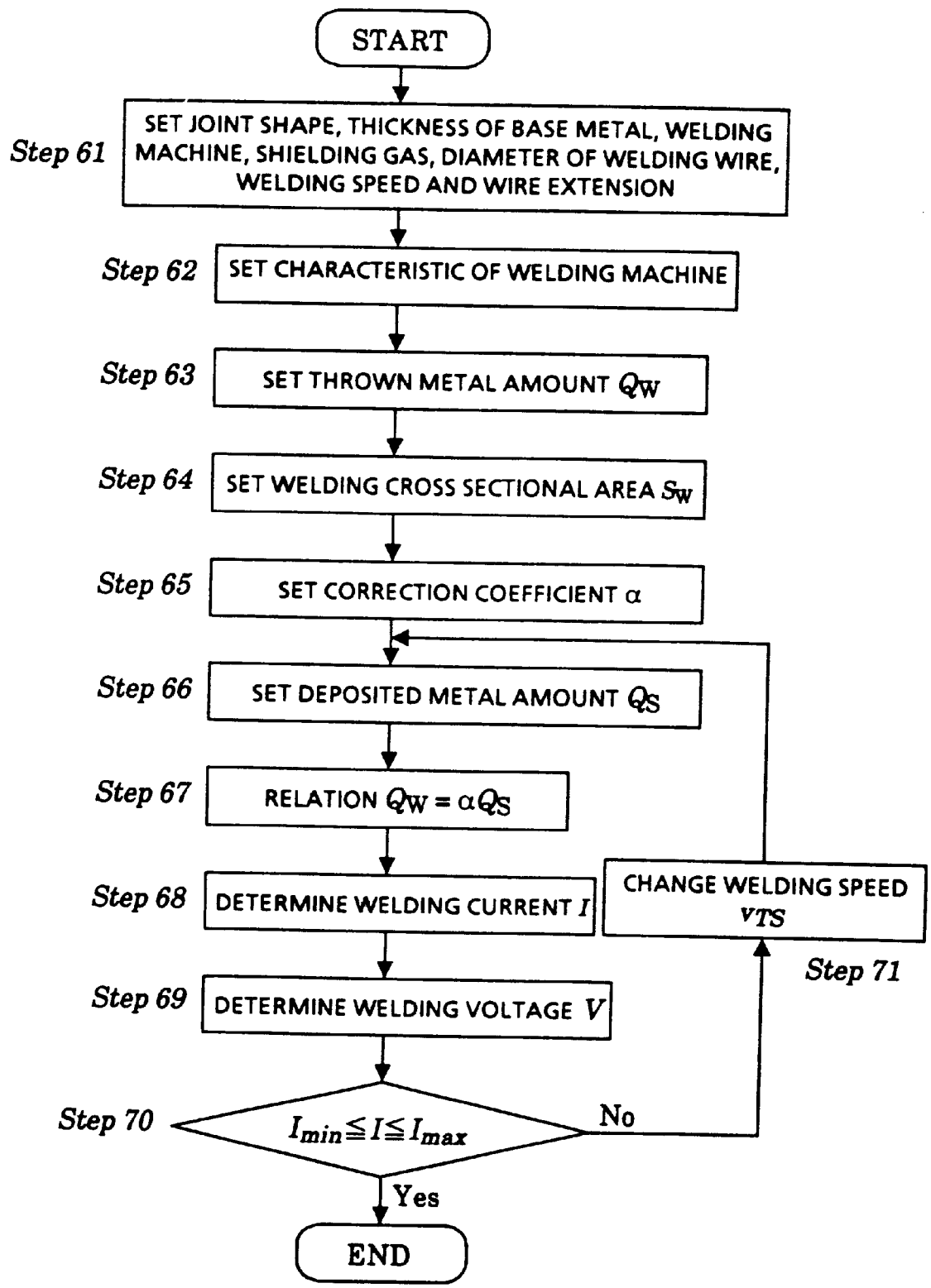
FIG. 13 is a flow chart which shows the total flow in accordance with a fourth embodiment of the invention.

Among the embodiments of a fourth solving means in accordance with the invention, a simple example is described below with reference to the drawing. FIG. 13 is a flow chart which shows the total flow in this embodiment.

In Step 61, a joint shape, a thickness of a base metal, a shielding gas, a welding machine, a welding speed and a wire extension are set.

In Step 62, a welding wire melting speed and a welding voltage are set from the welding machine and the shielding gas set in the Step 61. For example, the welding wire melting speed $v_w$ and the welding voltage V are set in the following expressions.

$$v_w = a_1 + a_2 I + a_3\ II^2,\ V = b_1 I + b_2$$

(In which I is a welding current, 1 is a wire extension and $a_1$, $a_2$, $a_3$, $b_1$ and $b_2$ are constant.)

In Step 63, an amount (a volume) Qw per unit time during which the welding wire melts to become a droplet is set by a diameter d of a welding wire and a welding wire melting speed $v_w$ set in the Step 61 and the Step 62.

$$Qw = v_w \pi d^2 / 4$$

In Step 64, a welding cross sectional area $S_w$ is set by the joint shape and the thickness of the base metal set in Step 61. For example, when the joint shape is set to a lap joint and the thickness of the base metal is set to t, $S_w = \pi t^2 / 4$ is obtained.

In Step 65, a correction value α for correcting the deposited metal amount is set in order to secure the welded quality.

In Step 66, a standard deposited metal amount Qs per a unit time is set by the welding speed $V_{TS}$ set in the Step 62 and the welding cross sectional area Sw set in the Step 64.

$$Qs = Sw V_{TS}$$

In Step 67, it is considered that a relation of equality is achieved between the thrown metal amount Qw per a unit time and the deposited metal amount Qs per a unit time which is corrected by the correction value α.

$$Qw = \alpha Qs$$

In Step 68, a welding current I is obtained by the relational expression set in Step 61 to Step 67.

In Step 69, a welding voltage V is obtained by the welding current I obtained in Step 68 and the relation between the welding current I and the welding voltage V, which is set in Step 62.

In Step 70, whether or not the welding current obtained in Step 68 is within an allowable range of the welding current is checked. When the value is within the range, the flow is completed, and when the value is out of the range, the flow goes to Step 71.

In Step 71, the welding speed $v_{TS}$ set in Step 61 is changed, the flow is returned again to Step 66 and the processes of Step 66 to Step 71 are repeated until the value becomes within the allowable range of the welding current in Step 70.

As mentioned above, the welding current, the welding voltage and the welding speed which are optimal for the welding object can be set in order of Step 61 to Step 71.

Figure 14:
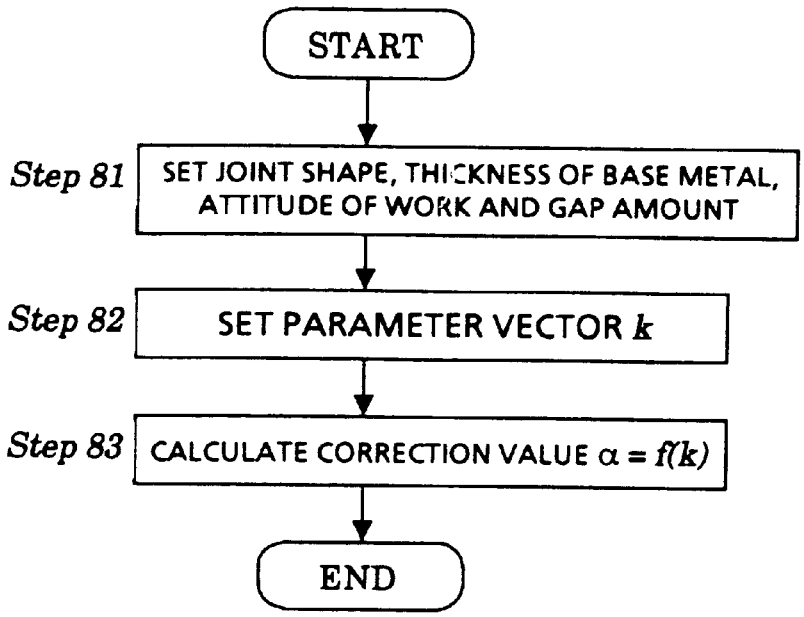

Next, an example of a method of setting correction value α for securing a welded quality will be described below with reference to FIG. 14.

In Step 81, a joint shape, a thickness of a base metal, an attitude of a work and a gap amount are set.

In Step 82, a joint shape parameter $k_J$, a base metal thickness parameter $k_T$, a work attitude parameter $k_F$ and a gap amount parameter $k_G$ are set and they are made a single parameter vector k.

$$k = (k_J, k_T, k_F, k_G)$$

In Step 83, the correction value α is obtained from the parameter vector k set the Step 82 in as in the following expression.

$$\alpha = f(k)$$

As mentioned above, the correction value α for securing a welded quality is set as described in Step 81 to Step 83.

Figure 15:
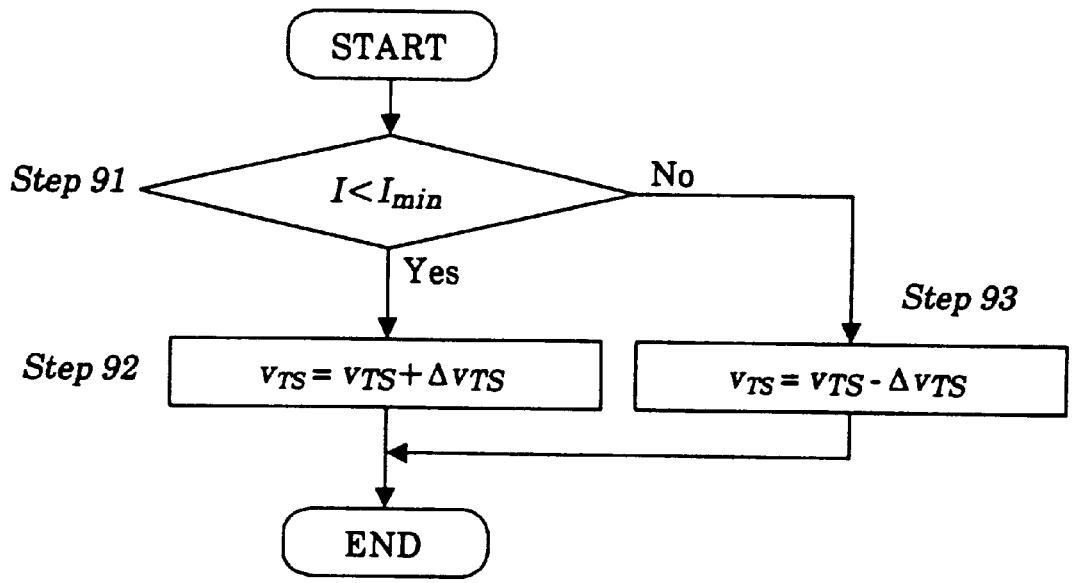
FIG. 15 is a flow chart which shows a method of adjusting welding speed.

Further, FIG. 15 is a flow chart which shows detail of changing the welding speed in Step 71 shown in FIG. 13.

In Step 91, when the calculated value I of the welding current which is out of the allowable range in the Step 70 shown in FIG. 13 is less than the minimum value of the welding current, the flow goes to Step 92, and otherwise (Imax<I), the flow goes to Step 93.

In Step 92, since it is judged in Step 91 that the welding current is lower than the allowable range, there is a risk that a lack of penetration and a lack of leg length are generated, and further, since tact time can be shortened, the welding speed is increased by $\Delta v_{TS}$.

In Step 93, since it is judged in Step 91 that the welding current is higher than the allowable range, there is a risk that a defect such as an undercut and a burn through may be generated, so that the welding speed is reduced by $\Delta v_{TS}$.

As mentioned above, the welding speed is adjusted as described in Step 91 to Step 93.

As mentioned above, according to this embodiment, by using a combination of the welding machine characteristic for every welding machine and the welding parameter which is individually set for every factor of welding it is possible to flexibly correspond to changes in the welding object and, further, by previously preparing the welding machine characteristics and the welding parameter, even a beginner in welding can easily set the welding condition. Further, since the welding cross sectional area is optimally corrected by the correcting value obtained from the welding parameter so as to obtain the welding conditions and the optimal welding speed is determined by the allowable range of the welding current and/or the allowable range of the heat input, a high weld quality can be obtained.

An embodiment of a fifth solving means in accordance with the invention is described below with reference to the drawings.

Figure 16:
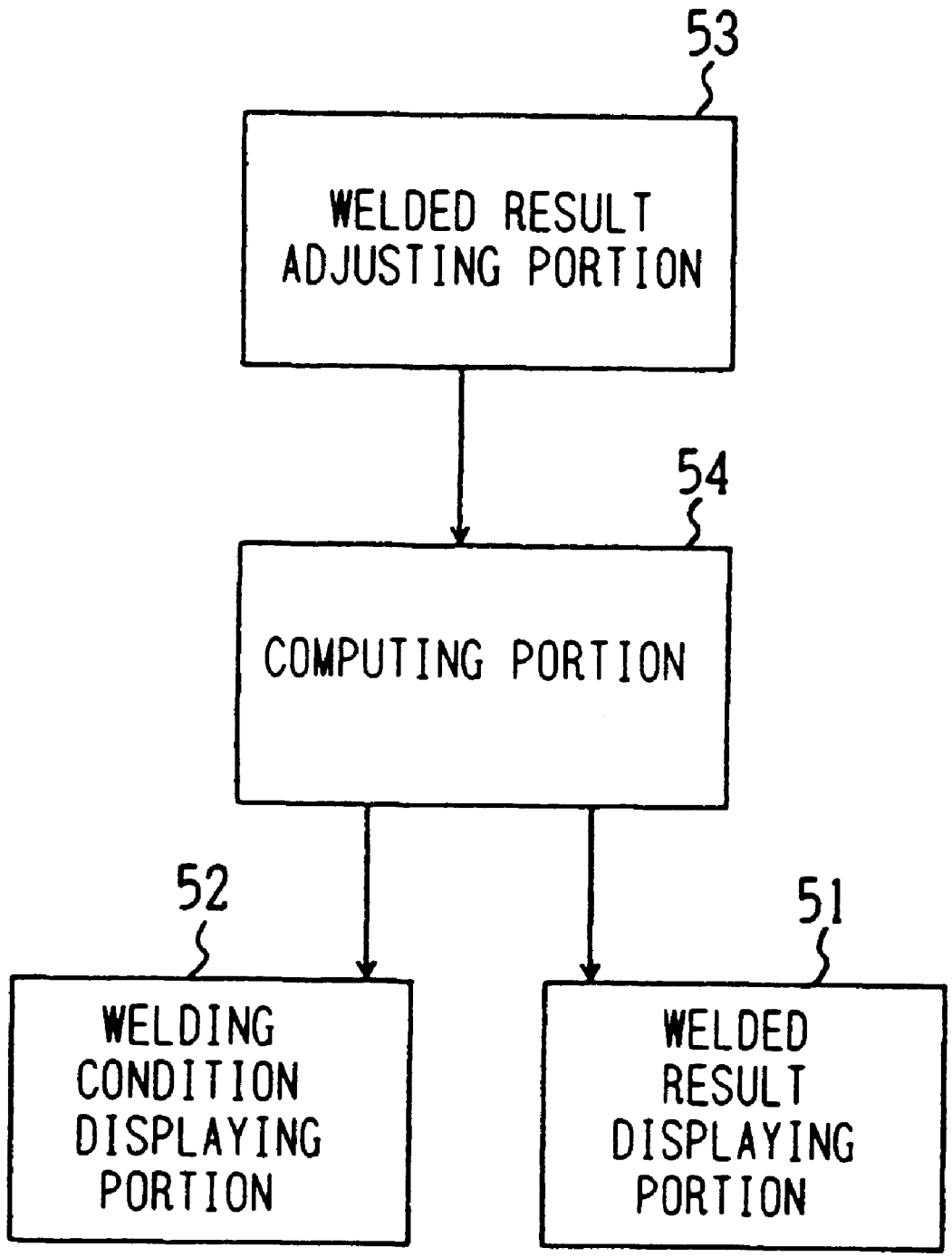
FIG. 16 is a conceptional view which shows a fifth embodiment of the invention.

FIG. 16 shows a schematic view of this embodiment.

Reference numeral 51 denotes a welded result displaying portion for displaying a bead shape and a penetration shape, reference numeral 52 denotes a welding condition displaying portion for displaying a welding speed, a welding current, a welding voltage or the like, reference numeral 53 denotes a welded result adjusting portion for adjusting a bead width, a reinforcement and a penetration depth and reference numeral 54 denotes a computing portion for estimating a welding condition on the basis of the parameter set by the welded result adjusting portion.

Figure 17:
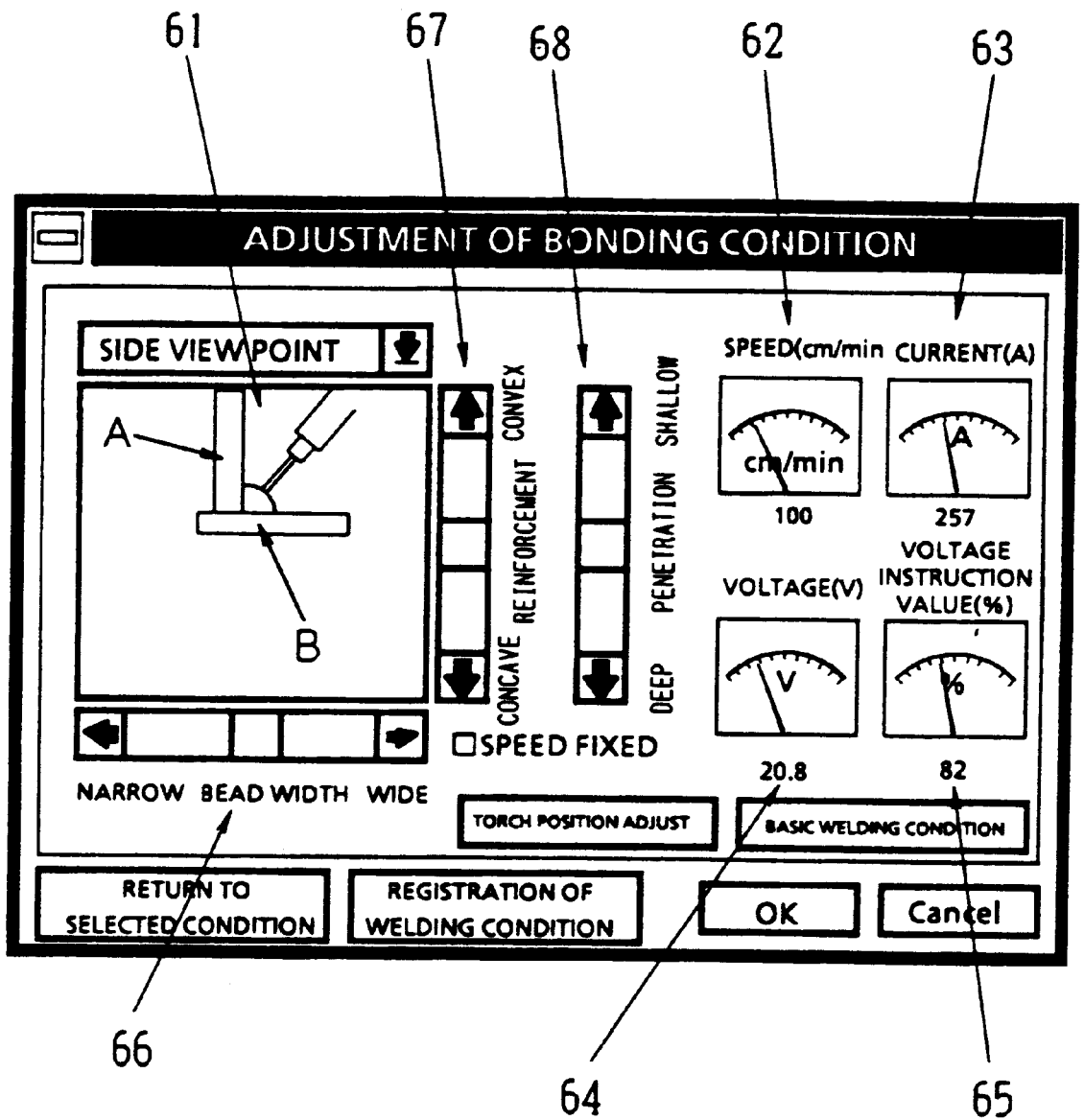
FIG. 17 is a view which shows an example of a graphical user interface in the fifth embodiment of the invention.

The welded result displaying portion 51 and the welding condition displaying portion 52 are constituted, for example, on one computer screen, and are a displayed as shown in FIG. 17.

A window portion 61 in FIG. 17 corresponds to the welded result displaying portion 51 on which, for example, cross sectional shapes of a base metal A and a base metal B, a bead shape and a welding torch are graphically displayed.

Now, a welded result to be obtained can be set on the screen within a predetermined range by utilizing a bead width adjusting portion 66, reinforcement adjusting portion 67 and a penetration depth adjusting portion 68. That is, it is adapted in such a manner that the bead shape in the window portion 61 is changed in accordance with motions of scroll bars. At that time, a welding speed displaying portion 62, a welding current displaying portion 63, a welding voltage displaying portion 64 and a voltage instruction value displaying portion 65 are adapted so as to be simultaneously changed by an operation of the computing portion 54, so that a numerical value can be automatically determined. In this embodiment, each of the displaying portions 62 to 65 is displayed as a figure similar to a meter. Further, there is a case that an angle of the welding torch displayed in the window portion 61 or the like is changed.

Figure 18:
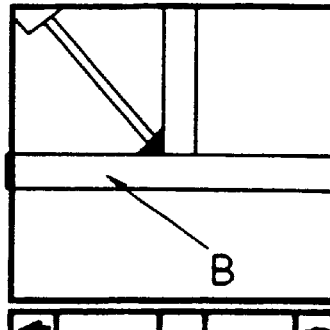
FIG. 18 is a chart which explains an operation in the fifth embodiment of the invention.

For example, as shown in FIG. 18, when an indicator is moved to a direction of "deep" using an arrow button in the penetration depth adjusting portion (a scroll bar) 68 ((A)→ (B)), each of the welding conditions (a displayed value in each of the meters) is changed in accordance with the amount of that movement.

Figure 19:
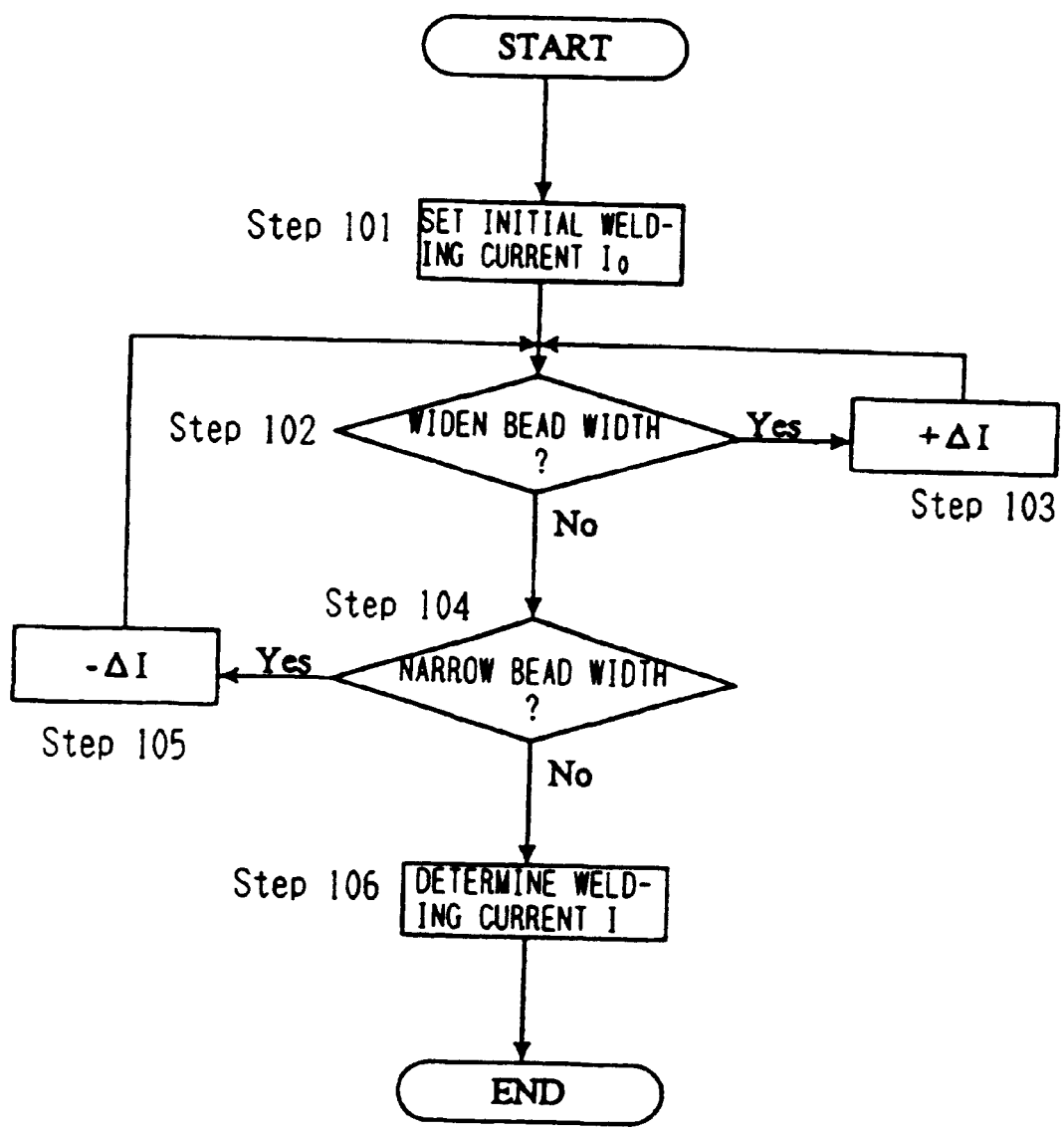
FIG. 19 is a view which shows the computing process flow of an apparatus in the fifth embodiment of the invention.

FIG. 19 is an example of a flow chart of a method of setting a welding condition by adjusting a bead shape among the processing flows in the computing portion 54, and here is utilized the fact that when a welding current is high the bead width increases.

An explanation is given below in the order of the steps.

In Step 101, a previously set welding current exists.

In Step 102, to increase a bead width, the flow goes to Step 103 and, otherwise, the flow goes to Step 104.

In Step 103, since on increased welding current increases bead width, the welding current is increased.

In Step 104, if a narrow bead width is desired, the flow goes to Step 105 and, otherwise, the flow goes to Step 106.

In Step 105, since a reduced welding current narrows the bead width, the welding current is reduced.

As mentioned above, according to this embodiment, since the welded condition is automatically adjusted by adjusting a welding result, welding conditions are simply adjusted, and further, the welded result can be intuitively recognized by using an image, so that even a beginner having little knowledge of welding can adjust the welding conditions to satisfy the required quality of the welding object.

An embodiment of a sixth solving means in accordance with the invention is described below with reference to the drawing.

FIG. 20 shows a displaying portion in this embodiment. In FIG. 20, reference numeral 71 denotes a welding state displaying portion, reference numeral 72 denotes a voltage meter, reference numeral 73 denotes a molten wire amount meter, reference numeral 74 denotes a deposited amount meter to a base metal in which a deposited amount is changed to an arrow direction. In this embodiment, an explanation is made by using an analogue type meter, but a digital display or a graphic may be used.

Figure 21:
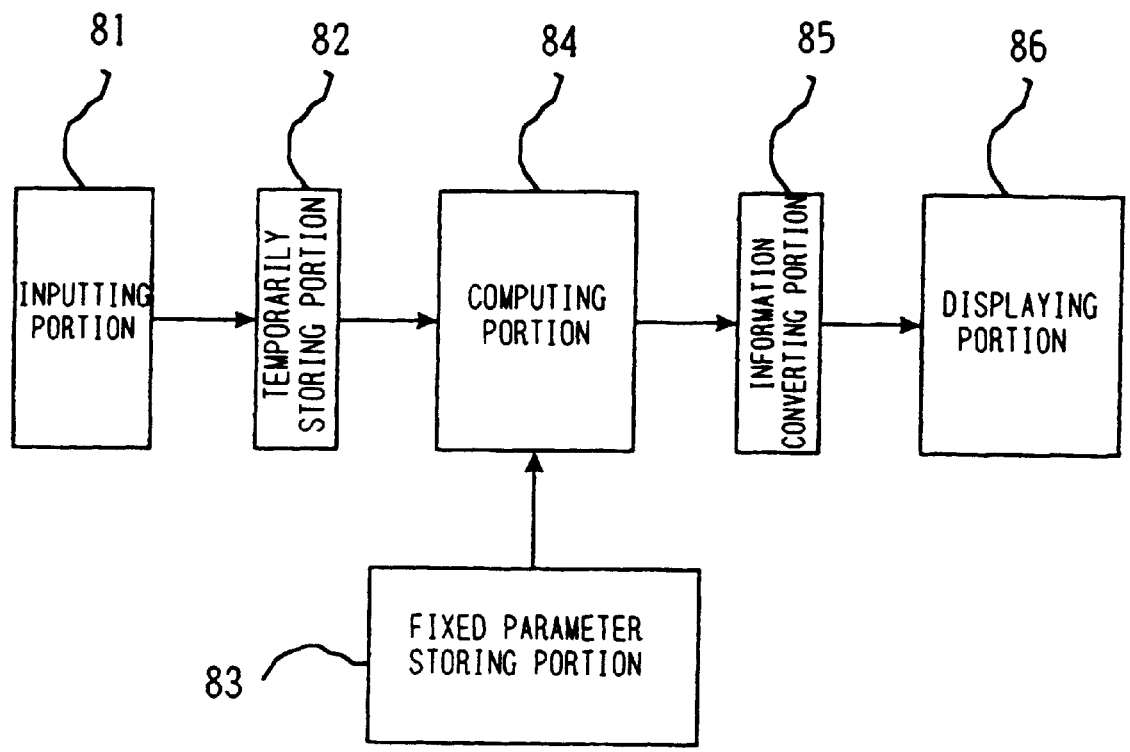
FIG. 21 is a block diagram which shows an apparatus for displaying a welding state in the sixth embodiment of the invention.

FIG. 21 is a block diagram of a display apparatus. Reference numeral 81denotes an inputting portion for inputting a wire diameter, a wire extension and a welding current, reference numeral 82 denotes a temporary storing portion for temporarily storing information from the inputting portion 81, reference numeral 83 denotes a fixed parameter storing portion for storing a relational expression between a molten welding wire amount or a deposited amount and a welding current, a wire diameter and a protruded wire length and storing a coefficient, reference numeral 84 denotes a computing portion for computing a molten welding wire amount or a deposited amount on a base metal on the basis of the information in the temporary storing portion 82 and the fixed parameter storing portion 83, and reference numeral 85 denotes an information converting portion for converting the information computed by the computing portion 84 into information which can be displayed on a displaying portion 86.

Figure 22:
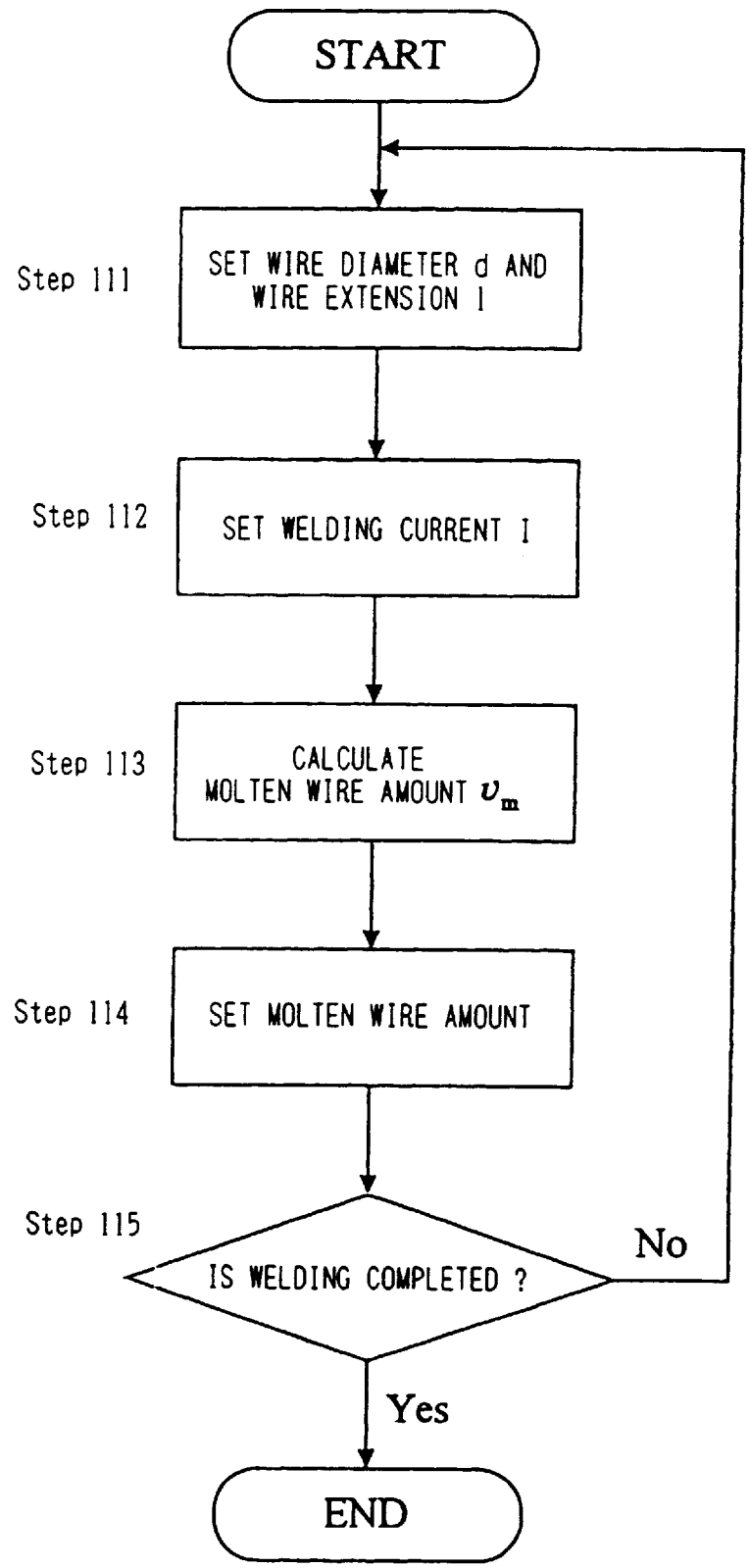
FIG. 22 is a flow chart which shows a method of displaying a welding state in the sixth embodiment of the invention.

FIG. 22 is a flow chart of a method of displaying a welding state in this embodiment, and here, an explanation is made for every step by an example of setting of a molten wire amount.

In Step 111, a wire diameter d and a protruded wire length 1 are set.

In Step 112, a welding current I is set.

In Step 113, a molten wire amount $v_m$ is calculated in accordance with the following expression.

$$v_m = aI/S_E + bl(I/S_G)^2$$

(In which $S_E$ is a wire cross sectional area ($S_E = \pi (d/2)^2$) and each of a and b is a coefficient.)

This is only an example, and a deposited bead cross sectional area $S_B$ may be calculated by the following calculating expression in place of the molten wire amount.

$$S_B = k(S_E \cdot v_M)/v_{TS}$$

(In which $v_{TS}$ is a welding speed (additionally set in the Step 111 or the Step 112 ) and k is a coefficient.)

In Step 114, a molten wire amount calculated in the Step 113 is set and displayed.

In Step 115, when the welding is completed, the flow is completed, and when the welding is not completed, the flow is returned to the Step 111, and then the Step 111 to the Step 115 are repeated.

As mentioned above, according to this embodiment, since the molten wire amount or the deposited amount is displayed to indicate the welding state in place of the welding current, the operator can easily obtain a size of bead irrespective of the operator's experience in arc welding, so that there is an advantage in that the desired welding bead can be easily obtained.

The invention can thus be used in the field of automatic welding.

What is claimed is:

1. An apparatus for automatically setting at least one welding condition parameter, comprising:

a welding information recording portion for recording welding operation information including welding machine information, shielding gas information, and welding wire information;

welding information inputting and outputting means for inputting and outputting said welding operation information;

welding operation information setting means for setting said welding operation information based on data from said welding information inputting and outputting means and said welding information recording portion, said set welding operation information including at least one welding condition parameter;

retrieval means for retrieving corresponding welding information from said welding information recording portion based on set information including set welding operation information;

information controlling means for controlling said retrieval means to retrieve corresponding welding information existing in said welding information recording portion and for providing the corresponding welding information to said welding information inputting and outputting means;

said welding information inputting and outputting means including:

a weld display for graphically displaying weld result data as at least one of a bead shape and a penetration shape of a weld to be made using the corresponding welding information;

a weld adjusting device for adjusting said at least one of said bead shape and the penetration shape by adjusting a predetermined parameter in accordance with user input; and a welding condition parameter display for displaying an estimated welding condition parameter estimated to provide of adjustment of said at least one of the bead shape and the penetration shape in accordance with said user input; and a computing device for calculating said estimated welding condition parameter, based on the predetermined parameter set by said weld adjusting, which will produce adjustment of said at least one of the bead shape and the penetration shape in accordance with said user input.

2. The apparatus according to claim 1, wherein said welding information recording portion includes means for storing and altering at least one of rule data and order and combination data for identifying acceptable combinations of welding operation information, welding workpiece information, and welding condition parameters.

3. The apparatus according to claim 1, wherein said welding information inputting and outputting means inputs welding information using at least one of a picture, a numerical value, a letter and a color and outputs a result using at least one of a picture, a numerical value, a letter and a color.

4. The apparatus according to claim 1, wherein said welding operation information setting means sets welding operation information in accordance with one of a welding operation condition setting order and a welding operation condition setting rule.

5. The apparatus according to claim 1, wherein said retrieval means retrieves information coinciding with the information set by said welding operation information setting means from said welding information recording portion.

6. The apparatus according to claim 1, wherein said information controlling means operates to effect the following:

transmitting a demand for retrieving corresponding information to said retrieval means;

outputting the retrieved corresponding information to the welding operation information setting means; and records information which is one of changed and added, using the welding information inputting and outputting means, into the welding information recording portion through said retrieving means.

7. An apparatus for setting welding parameters for welding a workpiece, comprising:

a welding information recording portion for recording:
welding operation information including a welding machine type;
welding workpiece information;
welding condition parameters to be set for welding the workpiece based on said welding operation information and said welding workpiece information; and
weld result data indicative of a weld to be produced by welding based on said welding condition parameters;

welding information inputting and outputting means for inputting and outputting said welding operation information, said welding workpiece information, said welding condition parameters and said weld result data;

welding operation information setting means for setting said welding operation information based on data from said welding information inputting and outputting means and said welding information recording portion, said set welding operation information including at least one welding condition parameter;

welding workpiece information setting means for setting said welding workpiece information;

retrieval means for retrieving corresponding welding information from said welding information recording portion based on set information including set welding operation information and set welding workpiece information when corresponding welding information exists;

result outputting means for outputting the welding information from said welding information recording portion;

information controlling means for controlling said retrieval means to retrieve corresponding welding information existing in said welding information recording portion and for providing the corresponding welding information to said result outputting means;

instruction information converting means for converting the corresponding welding information outputted by said result outputting means into instruction information for one of a robot and a welding machine;

welding information changing means for changing the corresponding welding information when a weld produced does not satisfy a welded quality judging criterion;

storage means for recording and storing only changed welding information into said welding information recording portion;

said welding information inputting and outputting means including:

a weld display for graphically displaying weld result data as at least one of a bead shape and a penetration shape of a weld to be made using the corresponding welding information;

a weld adjusting device for adjusting said at least one of said bead shape and the penetration shape by adjusting a predetermined parameter in accordance with user input; and a welding condition parameter display for displaying an estimated welding condition parameter estimated to provide of adjustment of said at least one of the bead shape and the penetration shape in accordance with said user input; and a computing device for calculating said estimated welding condition parameter, based on the predetermined parameter set by said weld adjusting, which will produce adjustment of said at least one of the bead shape and the penetration shape in accordance with said user input.

8. The apparatus according to claim 7, wherein said welding information recording portion includes range information, welding rule information, a welding method and wire type.

9. The apparatus according to claim 7, wherein said welding information inputting and outputting means inputs welding information using at least one of a picture, a numerical value, a letter and a color and outputs a result using at least one of a picture, a numerical value, a letter and a color.

10. The apparatus according to claim 7, wherein said welding operation information setting means sets said welding operation information based on previously stored welding operation information by using said welding information inputting and outputting means in accordance with one of a welding operation condition setting order and a welding operation condition setting rule.

11. The apparatus according to claim 7, wherein said welding workpiece information setting means sets said welding workpiece information characterizing the welding workpiece by one of selection of previously recorded welding workpiece information and inputting said welding workpiece information by using said welding information inputting and outputting means.

12. The apparatus according to claim 7, wherein said retrieval means selects from said welding information recording portion information coinciding with the information set by said welding information inputting and outputting means.

13. The apparatus according to claim 7, wherein said result outputting means outputs information obtained by said retrieval means using at least one of a picture, a numerical value, a letter, a color, a voltage and a current.

14. The apparatus according to claim 7, wherein said information controlling means operates to effect the following:

transmitting a demand for retrieving corresponding information to said retrieval means;

outputting the retrieved corresponding information to the welding operation information setting means when setting welding operation information and to the welding workpiece information setting means when setting welding workpiece information;

outputting one of the retrieved corresponding information and the calculated corresponding information including the welding condition parameters to the result outputting means; and recording the welding operation information and the welding workpiece information when changed by the welding information inputting and outputting means, recording the welding condition parameters retrieved or calculated into the welding information recording portion through said retrieval means.

15. The apparatus according to claim 7, wherein said instruction information converting means coverts the welding information outputted by said result outputting means into instruction information for setting at least one of a voltage and a current.

16. An apparatus for setting welding parameters for welding a workpiece, comprising:

a welding information recording portion for recording:
welding operation information including a welding machine type;
welding workpiece information;
welding condition parameters to be set for welding the workpiece based on said welding operation information and said welding workpiece information; and
weld result data indicative of a weld to be produced by welding based on said welding condition parameters;

welding information inputting and outputting means for inputting and outputting said welding operation information, said welding workpiece information, said welding condition parameters and said weld result data;

welding operation information setting means for setting said welding operation information based on data from said welding information inputting and outputting means and said welding information recording portion;

welding workpiece information setting means for setting said welding workpiece information;

retrieval means for retrieving corresponding welding information from said welding information recording portion based on set information including set welding operation information and set welding workpiece information when corresponding welding information exists;

welding information calculation and processing means for calculating corresponding welding information based on experimental data, correction information and limit information in the case that the corresponding information does not exist in said welding information recording portion;

result outputting means for outputting the welding information from one of said welding information recording portion and said welding information calculation and processing portion;

information controlling means for controlling:
said retrieval means to retrieve corresponding welding information when existing in said welding information recording portion; and
said welding information calculation and processing means to calculate corresponding welding information when not existing in the welding information recording portion and for providing the corresponding welding information to said result outputting means;

instruction information converting means for converting the corresponding welding information outputted by said result outputting means into instruction information for one of a robot and a welding machine;

welding information changing means for changing the corresponding welding information when a weld produced does not satisfy a welded quality judging criterion; and storage means for recording and storing only changed welding information into said welding information recording portion.

17. The apparatus according to claim 16, wherein said welding information recording portion includes range information, welding rule information, a welding method and wire type.

18. The apparatus according to claim 16, wherein said welding information inputting and outputting means inputs welding information using at least one of a picture, a numerical value, a letter and a color and outputs a result using at least one of a picture, a numerical value, a letter and a color.

19. The apparatus according to claim 16, wherein said welding operation information setting means sets said welding operation information based on previously stored welding operation information by using said welding information inputting and outputting means in accordance with one of a welding operation condition setting order and a welding operation condition setting rule.

20. The apparatus according to claim 16, wherein said welding workpiece information setting means sets said welding workpiece information characterizing the welding workpiece by one of selection of previously recorded welding workpiece information and inputting said welding workpiece information by using said welding information inputting and outputting means.

21. The apparatus according to claim 16, wherein said retrieval means selects from said welding information recording portion information coinciding with the information set by said welding information inputting and outputting means.

22. The apparatus according to claim 16, wherein said welding information calculation means corrects an influence due to a welding condition based on experimental data previously stored, a balance between a melted metal amount from a welding wire and a deposited metal amount to a base metal, and calculates a welding condition parameter and an expected weld result.

23. The apparatus according to claim 16, wherein said result outputting means outputs information obtained by said retrieval means and said welding information calculation means by using at least one of a picture, a numerical value, a letter, a color, a voltage and a current.

24. The apparatus according to claim 16, wherein said information controlling means operates to effect the following:

transmitting a demand for retrieving corresponding information to said retrieval means;

determining whether the corresponding information exists in said welding information recording portion;

outputting a calculation instruction to said welding information calculation and processing means to produce said calculated corresponding welding information when it is determined that the corresponding information does not exist in said welding information recording portion;

outputting the retrieved corresponding information to the welding operation information setting means when setting welding operation information and to the welding workpiece information setting means when setting welding workpiece information;

outputting one of the retrieved corresponding information and the calculated corresponding information including the welding condition parameters to the result outputting means; and recording the welding operation information and the welding workpiece information when changed by the welding information inputting and outputting means recording the welding condition parameters retrieved or calculated into the welding information recording portion through said retrieval means.

25. The apparatus according to claim 16, wherein said instruction information converting means coverts the welding information outputted by said result outputting means into instruction information for setting at least one of a voltage and a current.

26. The apparatus according to claim 16, wherein said welding information inputting and outputting means includes at least three modes comprising a full automatic mode, a speed setting mode and a detail setting mode as modes for setting said welding operation information.

27. The apparatus according to claim 26, wherein the full automatic mode retrieves thickness and a joint shape recorded in the welding information recording portion and a welding speed previously set in welding rule information.

28. The apparatus according to claim 26, wherein the speed setting mode permits optional setting of a welding speed in terms of an absolute value or a range by means of the welding information inputting and outputting means.

29. The apparatus according to claim 26, wherein the detail setting mode permits optional setting of all the information recorded in the welding information recording portion by means of the welding information inputting and outputting means.

30. A method of setting a welding condition parameter by calculating the welding condition parameter comprising the steps of:

setting one of a welding machine characteristic parameter and a welding machine characteristic expression;

setting a welding cross sectional area;

setting a correction value;

setting a melted metal amount based on said one of said welding machine characteristic parameter and the welding machine characteristic expression;

setting a deposited metal amount based on workpiece parameters; and calculating a welding condition parameter by setting a value obtained by multiplying said deposited metal amount by said correction value equal to said melted metal amount.

31. The method of setting a welding condition parameter according to claim 30, wherein a welding speed is adjusted in such a manner that the obtained welding condition parameter is within at least one of an allowable range of welding current and an allowable range of heat input.

32. The method of setting a welding condition parameter according to claim 31, wherein said one of said welding machine characteristic parameter and the welding machine characteristic expression is set based on a relation the welding current, a welding wire melting speed and the welding voltage.

33. The method of setting a welding condition parameter according to claim 31, wherein said melted metal amount is determined by said welding current, a welding wire melting speed, and a diameter of a welding wire.

34. The method of setting a welding condition parameter according to claim 31, wherein said deposited metal amount is determined by said welding cross sectional area and the welding speed.

35. The method of setting a welding condition parameter according to claim 30, wherein said welding cross sectional area is determined by a joint shape and a thickness of a base metal.

36. The method of setting a welding condition parameter according to claim 30, wherein said correction value is determined by:

a welding element which is one of a joint shape, a thickness of a base metal, a material of a base metal, an attitude of a work, a gap amount of a work, and a material of a welding wire; and a welding demand element which is one of a bead width, a penetration depth, an amount of an excess weld metal, and a leg length.

37. An apparatus for adjusting a welding condition parameter comprising:

a weld display for graphically displaying at least one of a bead shape and a penetration shape of a weld to be made using the welding condition parameter;

a weld adjusting device for adjusting said at least one of said bead shape and the penetration shape by adjusting a predetermined parameter;

a computing device for estimating a welding condition parameter based on the predetermined parameter set by said weld adjusting; and a welding condition parameter display for displaying the welding condition parameter estimated by said computing device.

38. The apparatus according to claim 37, wherein said predetermined parameter includes at least one of a size, a leg length, a bead width, a reinforcement, a penetration depth or a throat thickness.

39. The apparatus according to claim 37, wherein said welding condition parameter includes at least one of a welding current, a welding voltage, a welding speed, a target position of a welding torch or a target angle of a welding torch.

40. A method of displaying welding conditions, comprising the steps of:

generating and displaying in cross section a weld, showing a deposited weld amount, which is to be executed by an arc welder wherein an appearance of the weld is based on welding condition parameters;

displaying at least one of said welding condition parameters;

accepting input for modifying a characteristic of the weld;

generating and displaying in cross section the weld having the modified characteristic; and displaying said at least one of said welding condition parameters modified to produce the weld having the modified characteristic.

41. A method of displaying a welding state as cited in claim 40, wherein an analogue/digital meter or a graphic is used for displaying said deposited weld amount.

42. The method of claim 40, wherein a relational expression including coefficients is used for determining said deposited weld amount.

43. The method of claim 40, wherein an input device is provided for accepting input and includes at least one of a switch, a numeric value input device, an electric/electronic signal input device, and a graphical user interface.

44. The method of claim 40, further comprising accepting input as said welding condition parameters at least one of a welding current, a wire diameter, a wire extension and a welding speed.

45. The method of claim 40 further comprising the steps of:

generating and displaying a cross-sectional image of a workpiece in the form of a base metal; and generating and displaying an image of a consumable electrode arc welder welding the base metal thereby showing the consumable electrode arc welder apply the deposited weld amount to the base metal.

* * * * *